United States Patent

Nair

(10) Patent No.: US 9,037,504 B2
(45) Date of Patent: May 19, 2015

(54) SYSTEM AND METHOD FOR AN INTERACTIVE SHOPPING NEWS AND PRICE INFORMATION SERVICE

(75) Inventor: Mark Nair, Amarillo, TX (US)

(73) Assignee: Tensilrus Capital NV LLC, Wilmington, DE (US)

( * ) Notice: Subject to any disclaimer, the term of this patent is extended or adjusted under 35 U.S.C. 154(b) by 1201 days.

(21) Appl. No.: 11/705,003

(22) Filed: Feb. 12, 2007

(65) Prior Publication Data

US 2008/0091667 A1  Apr. 17, 2008

Related U.S. Application Data

(63) Continuation of application No. 09/931,626, filed on Aug. 16, 2001, now Pat. No. 7,177,818.

(60) Provisional application No. 60/226,177, filed on Aug. 18, 2000.

(51) Int. Cl.
  G06Q 30/00 (2012.01)
  G06F 13/00 (2006.01)
  G06F 17/30 (2006.01)
  G06Q 30/02 (2012.01)
  G06Q 30/06 (2012.01)

(52) U.S. Cl.
  CPC .......... G06F 17/30864 (2013.01); G06Q 30/02 (2013.01); G06Q 30/0281 (2013.01); G06Q 30/0601 (2013.01); Y10S 707/99935 (2013.01)

(58) Field of Classification Search
  CPC ............... G06Q 30/0601; G06Q 10/10; G06F 12/0891; G06F 12/0868
  USPC ............ 705/26.1, 27.1, 27.2, 26.61; 711/118, 711/133
  See application file for complete search history.

(56) References Cited

U.S. PATENT DOCUMENTS

| | | |
|---|---|---|
| 5,410,598 A | 4/1995 | Shear |
| 5,802,524 A | 9/1998 | Flowers et al. |
| 6,278,993 B1 | 8/2001 | Kumar et al. |
| 6,405,175 B1 * | 6/2002 | Ng .............................. 705/14.26 |
| 6,449,695 B1 * | 9/2002 | Bereznyi et al. .............. 711/134 |
| 6,587,835 B1 | 7/2003 | Treyz et al. |
| 6,605,121 B1 | 8/2003 | Roderick |
| 6,976,006 B1 | 12/2005 | Verma et al. |

(Continued)

FOREIGN PATENT DOCUMENTS

| | | |
|---|---|---|
| EP | 0618708 A2 | 10/1994 |
| WO | WO 98/53410 | 11/1998 |

(Continued)

OTHER PUBLICATIONS

Web-page from www.howstuffworks.com from Oct. 1, 2006.

(Continued)

*Primary Examiner* — Courtney Stopp

(57) ABSTRACT

A system and associated method for assisting a user to efficiently query for product information and promotional information available from electronic commerce websites over the Internet includes a sub-server for searching the electronic commerce websites, a controlling server, and a local database. The method involves determining whether product information related to a user query is cached in a local database and if the requested information is not cached, searching the electronic commerce websites for the requested information.

19 Claims, 18 Drawing Sheets

(56) References Cited

U.S. PATENT DOCUMENTS

| | | |
|---|---|---|
| 7,058,598 B1 | 6/2006 | Chen et al. |
| 7,107,226 B1 | 9/2006 | Cassidy et al. |
| 7,127,414 B1 | 10/2006 | Awadallah et al. |
| 7,246,110 B1 | 7/2007 | Musgrove et al. |
| 7,761,345 B1 | 7/2010 | Martin et al. |
| 2002/0007461 A1 | 1/2002 | Garrison |
| 2002/0038238 A1 | 3/2002 | Fujita |
| 2003/0111531 A1 | 6/2003 | Williams |
| 2003/0187705 A1 | 10/2003 | Schiff et al. |

FOREIGN PATENT DOCUMENTS

| | | |
|---|---|---|
| WO | WO 99/57656 | 11/1999 |
| WO | WO 01/77883 | 10/2001 |

OTHER PUBLICATIONS

Non-Final Office Action on U.S. Appl. No. 11/674,134, mailed Nov. 28, 2011.

Business editors, "ShopNow.com Acquires Leading Shopping BOT, bottomdollar.com," Business Wire, New York, Dec. 20, 1999, 3 pages.

Notice of Allowance on U.S. Appl. No. 11/674,134, mailed Apr. 12, 2012.

Saharia, Aditya N. et al., "Enhancing Data Warehouse Performance Through Query Caching," Database for Advances in Information Systems, New York, Summer 2000, vol. 31, Iss. 3, 19 pages.

Final Office Action on U.S. Appl. No. 11/674,134, mailed Feb. 17, 2011.

International Preliminary Examination Report on PCT/US01/025589, completed Oct. 15, 2007.

International Search Report on PCT/US01/025589, mailed Feb. 17, 2003.

Final Office Action on U.S. Appl. No. 09/931,626, mailed Jun. 27, 2006.

Non-Final Office Action on U.S. Appl. No. 09/931,626, mailed Oct. 7, 2005.

Non-Final Office Action on U.S. Appl. No. 11/674,134, mailed Oct. 8, 2010.

Notice of Allowance on U.S. Appl. No. 09/931,626, mailed Oct. 18, 2006.

* cited by examiner

SYSTEM AND METHOD FOR AN INTERACTIVE SHOPPING NEWS AND PRICE INFORMATION SERVICE

CROSS REFERENCE TO RELATED APPLICATIONS

This application is a continuation of U.S. application Ser. No. 09/931,626 filed Aug. 16, 2001, now U.S. Pat. No. 7,177,818 which claims priority to U.S. Provisional Application Ser. No. 60/226,177 filed Aug. 18, 2000.

BACKGROUND OF THE INVENTION

This invention relates generally to electronic commerce ("e-commerce") over the Internet, and more specifically to a method and system for assisting a user to efficiently search for specific product, price, and promotional information from a multitude of e-commerce websites.

One of the main problems with the proliferation of data now available on the Internet is the massive amount of information, attractions, and website locations available to the user. Internet users are burdened with information overload and most users will decide that their time is too valuable to flail about aimlessly, looking for specific information. Thus, these overburdened users resort to simply using a few familiar websites to avoid having to sift through extraneous information. Unfortunately, these users deprive themselves of much of the useful information that is available on the multitude of e-commerce websites that now exist.

A solution for handling this information deluge came in the form of search engines that take a user's query and try to excavate useful information from different websites. While the theory behind these websites is sound, in practice they can exacerbate the very problem that their design had hoped to avoid. At issue is whether these search engines, which scour the Internet for an answer to the user's query, are particularly successful in delivering either a solid abstract of information or in listing a series of websites that have a demonstrable link to the content that interests the user. For the most part, these search engines continue to overwhelm the user with irrelevant information. Indeed, even "portal" websites, which claim to narrowly limit the user's browsing experience based on the query criterion that the user has defined, offer an overflow of information. In response to this problem, the "bot" was created.

The bot itself is nothing more than an automatic computerized function that acts on pre-programmed behaviors. Much like an air conditioner or sprinkler system that turns on when certain conditions develop, the bot has specific criterion or rules that command its behavior. Portal websites, by their very nature, utilize bots that acquire information and then index that data for users' queries. However, the bot functionality in the case of portal websites is autonomous from the user's search since it does not search the Internet as a whole each time the user posits a question. Instead, the search engine searches its own indexed database that its bot has already constructed.

This design, although functional, has its limitations. Primarily the search engine is limited in its ability to present timely, updated information. If, for example, contextual information on e-commerce websites changes quite dramatically from minute to minute, the traditional bot methodology fails to update this dynamic flow of data. When the user queries the bot's findings, the search engine presents information that is both old and erroneous. If a user relies on such flawed and outdated information to make an immediate economic decision, e.g. deciding whether to make a purchase based on the price of an item as it is reported by the search engine, the results can be extremely unfortunate.

A natural implementation of the information bot is to aid users in shopping efficiently on the. Internet. With the variety of Internet shops, stores, and malls, a rational and price-minded consumer can have difficulty evaluating, monitoring, and comparing prices, quality, quantity, and availability of goods. Moreover, with the limitations of traditional search engines, the user can have trouble locating timely, up to date information concerning desired goods. What is needed is a bot capable of executing instructions to locate price and other product information based on a user's shopping criteria and instructions to regularly update such information thus allowing a shopper to quickly and efficiently find the best Internet e-commerce website for their eventual transaction.

SUMMARY OF THE INVENTION

The present invention is a method and system that overcomes the problems described above by allowing a user to search a plurality of e-commerce websites with a single query. An advantage of the present invention is that the cached product and promotional information is regularly updated providing timely and useful information. Another advantage of the present invention is that an active search of e-commerce websites need not be performed for every search, thus preserving Internet bandwidth.

These and other advantages are achieved in a system for assisting a user to efficiently query for product information and promotional information available from electronic commerce websites over the Internet, which includes at least one sub-server that sends requests to and receives replies from at least one available website based on a user query. The system also includes a server, operably connected to the at least one sub-server, which communicates the user query to and controls the operation of the at least one sub-server. The system further includes a local database, operably connected to the server, which stores the product and promotional information. The local database is updated at specific time intervals or at a request from a user.

These and other advantages are also achieved in a method, associated with the system, for assisting a user to efficiently query for product information and promotional information available from electronic commerce websites over the Internet, which includes checking a local database to find a match to a user query. The user query relates to at least one product the user desires to find product information for from at least one available website. The method also includes accepting a selection input from the user, if the local database contains at least one match to the user query. The user refines the user query by specifically selecting the at least one product for which the user desires to find the product information. The method further includes determining whether the local database has cached the product information relating to the at least one product within a specified time limit. The method also includes polling the at least one available website, if the local database has not cached the product information within the specified time limit. The product information for the at least one selected product is retrieved and is cached by the local database. The method further includes displaying the polling results to the user, so that the user may locate the at least one available website that offers the at least one product associated with the desired product information.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION OF THE PRESENT INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions.

Embodiments of the present invention include a system and method (including services, processes, logistics, and technology) for efficiently searching e-commerce websites that overcome the difficulties and obstacles currently present. The term "e-commerce", as used herein, refers to electronic commerce, electronic business and any other commerce and business conducted over the Internet, or other network, in which items are offered for purchase. The term "item(s)", as used herein, refers to products, services, and other things, tangible and intangible, that can be purchased.

Figure 1A:
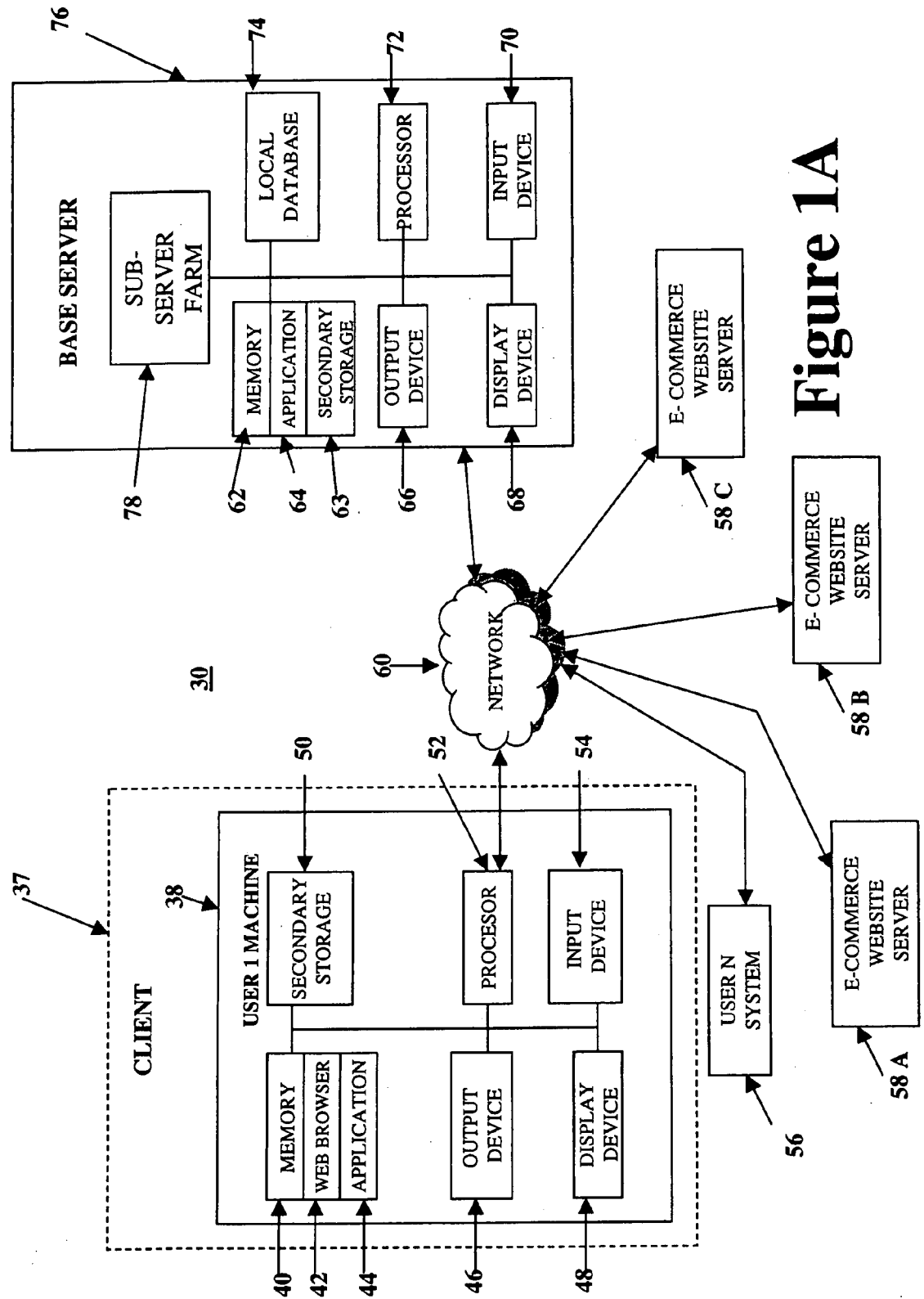
FIGS. 1A and 1B are block diagrams for a system for facilitating efficient searching of e-commerce websites over the Internet.

With reference now to FIG. 1A, there is illustrated a block diagram showing exemplary hardware components for implementing an interactive shopping system, generally designated by the reference numeral 30, and methods described hereinbelow for efficiently searching e-commerce websites. Interactive shopping system 30 includes a client, generally designated by the reference numeral 37, or user system, having a user machine 38 therein connected with a network 60, such as the Internet, providing a network connection for searching representative e-commerce website servers 58A, 58B, 58C, etc. that are available to the interactive shopping system 30. Other clients, such as client 56, may also be connected with network 60 for searching e-commerce websites. It should, of course, be understood that client 56, and other clients, may include the same components as client 37.

There are generally two preferred methods for determining whether or not to list an e-commerce website as an available website. First, a partnership arrangement may be reached between the e-commerce website's operators and the operators of the interactive shopping system 30. The partnership agreement allows the operators of the interactive shopping system to designate the e-commerce website as an available website and to gather product and promotional information from the e-commerce website. Another possibility is for the operators of the interactive shopping system 30 to monitor the e-commerce landscape and, based on editorial guidelines (e.g., depth of an e-commerce website's product catalogue, ease of website navigation) and a particular e-commerce website's competition, the operators of interactive shopping system 30 can decide to designate the e-commerce website as an available website. The operators can then navigate the e-commerce website and gather the necessary product and promotional information.

Figure 1B:
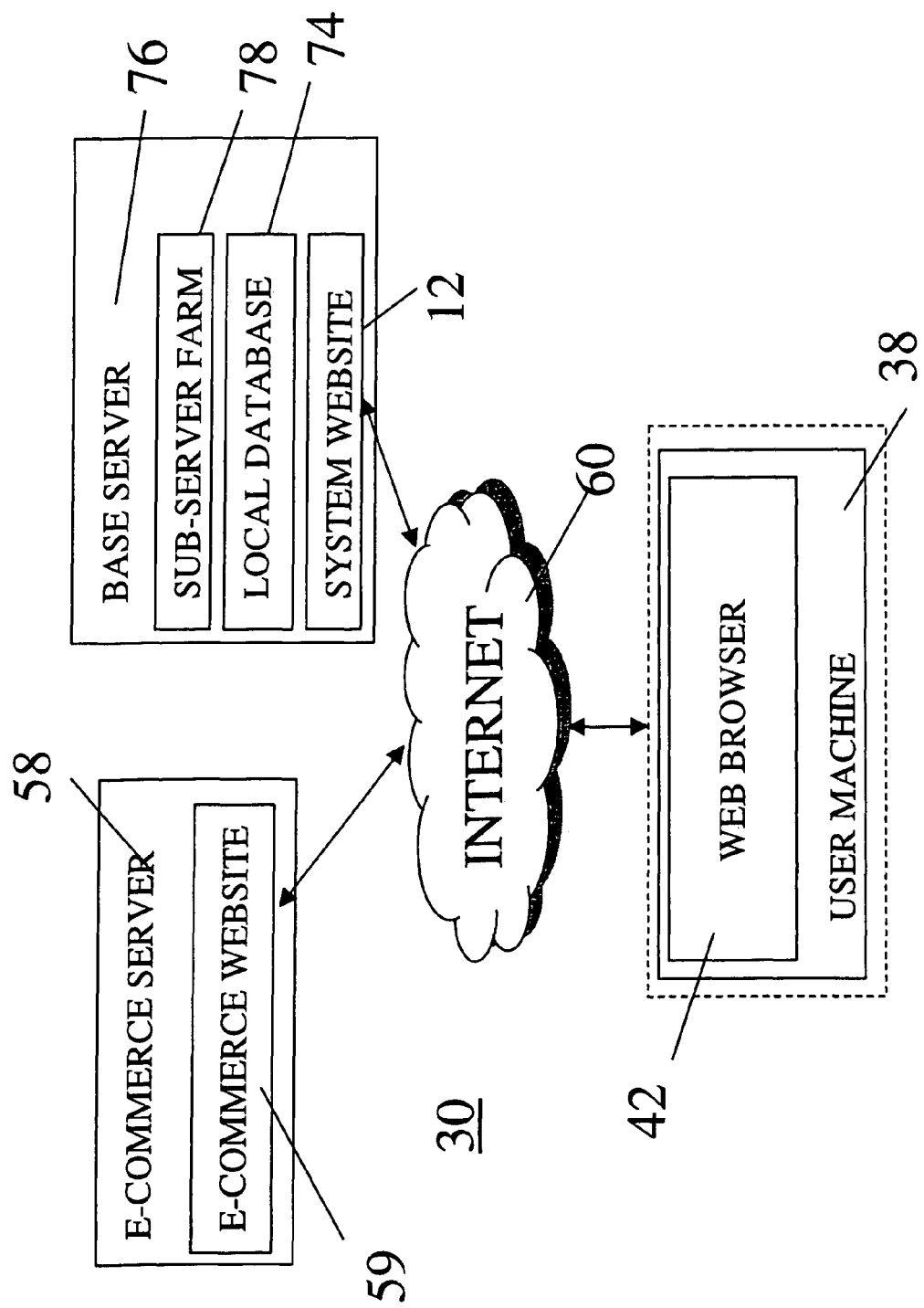

With reference now to FIG. 1B, users at clients 37 and 56 (as shown in FIG. 1A) interact with a base server 76 through the user machine 38 to search e-commerce websites for product, price and promotional information. Base server 76 provides and maintains a system website 12 for providing a network connection for the client 37 to the system website 12 on the base server 76. The interactive shopping system 30, through the base server 76, can process a user query by way of a sub-server farm 78, the results of which can be stored within a local database 74. Interactive shopping system 30 processes a user query by allowing the base server 76 to access one or more of the aforedescribed e-commerce website server(s) 58 (maintained by third-party e-tailors) in order to search a number of e-commerce website(s) 59, or specifically the e-commerce website server(s) 58 that support the e-commerce website(s) 59, over the Internet or other network 60 for item information, e.g., item price, or promotional information on the World Wide Web. Only one user system is shown for illustrative purposes only. It should, of course, be understood to one skilled in the art that the interactive shopping system 30 may include many user machines 38 and may be scalable to add or delete user machines 38 to or from the network 60.

Referring back to FIG. 1A, user machine 38 illustrates typical components of a user machine. User machine 38 typically includes a memory 40, a secondary storage device 50, a processor 52, an input device 54, a display device 48, and an output device 46. Memory 40 may include random access memory (RAM) or similar types of memory, and it may store one or more applications 44 and a web browser 42, for execution by processor 52. Secondary storage device 50 may include a hard disk drive, floppy disk drive, CD-ROM drive, or other types of non-volatile data storage, as understood in the art. Processor 52 may execute applications or programs stored in memory 40 or secondary storage 50 or received from the Internet or other network 60. Input device 54 may include any device for entering information into the user machine 38, such as a keyboard, mouse, cursor-control device, touch-screen, infrared, microphone, digital camera, video recorder or camcorder. Display device 48 may include any type of device for presenting visual information such as, a computer monitor or flat-screen display. Output device 46 may include any type of device for presenting a hard copy of information, such as a printer, and other types of output devices include speakers or any device for providing information in audio form.

Web browser 42 is used to access application(s) 64 on the base server 76 through the system website 12, as illustrated in FIG. 1B, and display various HTML webpages through which the user can search e-commerce websites 59 for item and promotional information. Examples of these HTML webpages are described below. Examples of web browsers include the Netscape Navigator program and the Microsoft Internet Explorer program. Any web browser, co-browser, or other application capable of retrieving content from a network and displaying pages or screens may be used.

Examples of user machines for interacting with the system website 12 include personal computers, laptop computers, notebook computers, palm top computers, network computers, or any processor-controlled device capable of executing a web browser or other type of application for interacting with the system.

Figure 7:
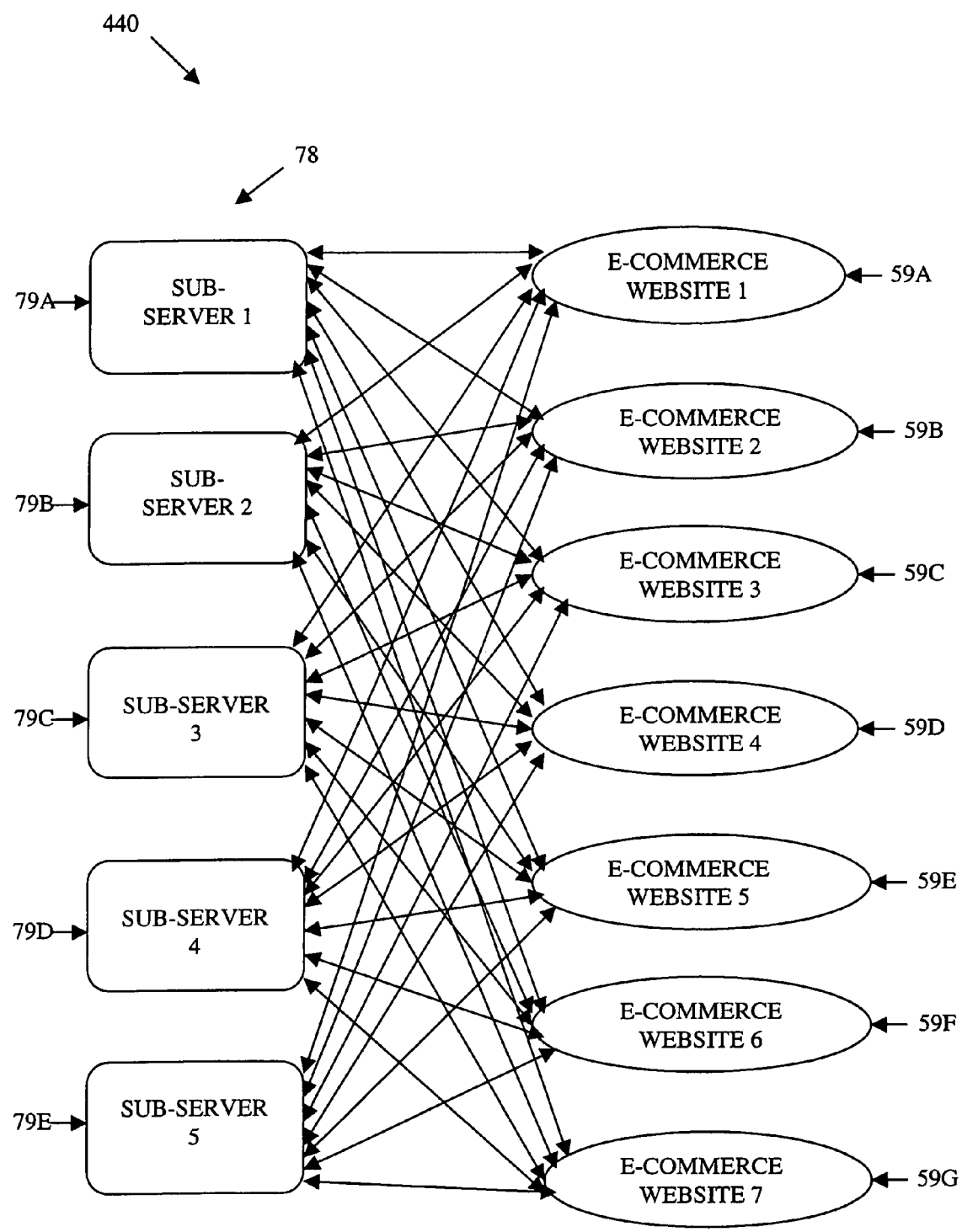
FIG. 7 is a diagram of a sub-server farm linking and searching for information from various e-commerce websites.

Base server 76 typically includes a memory 62, a secondary storage device 63, a processor 72, an input device 70, a display device 68, and an output device 66. The base server 76 preferably also includes the aforementioned sub-server farm 78, which sends out sub-servers 79 (see FIG. 7) to actively search the aforedescribed e-commerce website servers 58A, 58B, 58C, etc. for item and promotional information. The sub-servers 79 may include all or some of the elements present in the base server 76. Memory 62 may include RAM or similar types of memory, and it may store one or more applications 64 for execution by the processor 72. Secondary storage device 63 may include a hard disk drive, floppy disk drive, CD-ROM drive, or other types of non-volatile data storage. Processor 72 executes the application(s) 64 (e.g., search and display instructions as described below) that is preferably stored in memory 62, secondary storage 63, or received from the Internet or other network 60. Input device 70 may include any device for entering information into the base server 76, such as a keyboard, mouse, cursor-control device, touch-screen, infrared, microphone, digital camera, video recorder or camcorder. Display device 68 may include any type of device for presenting visual information such as, for example, a computer monitor or flat-screen display. Output device 66 may include any type of device for presenting a hard copy of information, such as a printer, and other types of output devices include speakers or any device for providing information in audio form.

Local database 74 may maintain a relational or object-oriented database (or any other type of database) for storing information concerning item and promotional information that is received by the base server 76 when the sub-server farm 78 performs searches of the various e-commerce website servers 58A, 58B, 58C, etc. This information includes: the searched e-commerce websites' universal resource locators ("URLs"), item identification data, item price and/or description data, and promotional information.

Also, processor 72 may execute one or more software applications 64 in order to provide the functions described in this specification, and the processing may be implemented in software, such as software modules, for execution by computers or other machines. The processing may provide and support the searching methods and display methods described in this specification and otherwise for display on display devices associated with the user machines 38. The term "screen" refers to any visual element or combinations of visual elements for displaying information or forms; examples include, but are not limited to, user interfaces on a display device or information displayed in webpages on a display device. The screens may be formatted, for example, as webpages in HyperText Markup Language (HTML), Extensible Markup Language (XML) or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device (i.e., a mouse) to "click on" or "double-click on" the section; alternatively, sections may be selected by entering a series of keystrokes or in other ways such as through voice commands or use of a touch screen. In addition, although the screens described below illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

Although only one base server 76 is shown, interactive shopping system 30 may use multiple servers as necessary or desired to support the users and may also use back-up or redundant servers to prevent network downtime in the event of a failure of a particular server. In addition, although user machine 38 and base server 76 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program items or computer-readable media, such as secondary storage devices, including hard disks, floppy disks, or CD-ROM; a carrier wave from the Internet or other network; or other forms of RAM or ROM. The computer-readable media may include instructions for controlling a computer system, such as user machine 38 and the base server 76, to perform a particular method.

An e-commerce website 59 typically includes object-oriented screens (e.g., HTML webpages) for each item or bit of promotional information offered by the e-commerce website 59. The screens typically comprise a pattern of strings that represent certain data (or information) about the items or the promotional information. Generally, the string pattern is standard for all the items or promotional information offered by a specific e-commerce website 59 so that the same strings represent the same type of data for each e-commerce webpage. Consequently, analyzing the e-commerce website 59 preferably includes viewing the e-commerce website 59 item screens and determining the string pattern(s) on the item screens that indicate the requisite data (e.g., e-retailer name, item name, item description, item type (e.g., camera, car, CD, book, etc.), item price, picture of item (e.g., a gif or jpeg of the item), and promotional information.

A. Overview of Interactive Information Service

Figure 2:
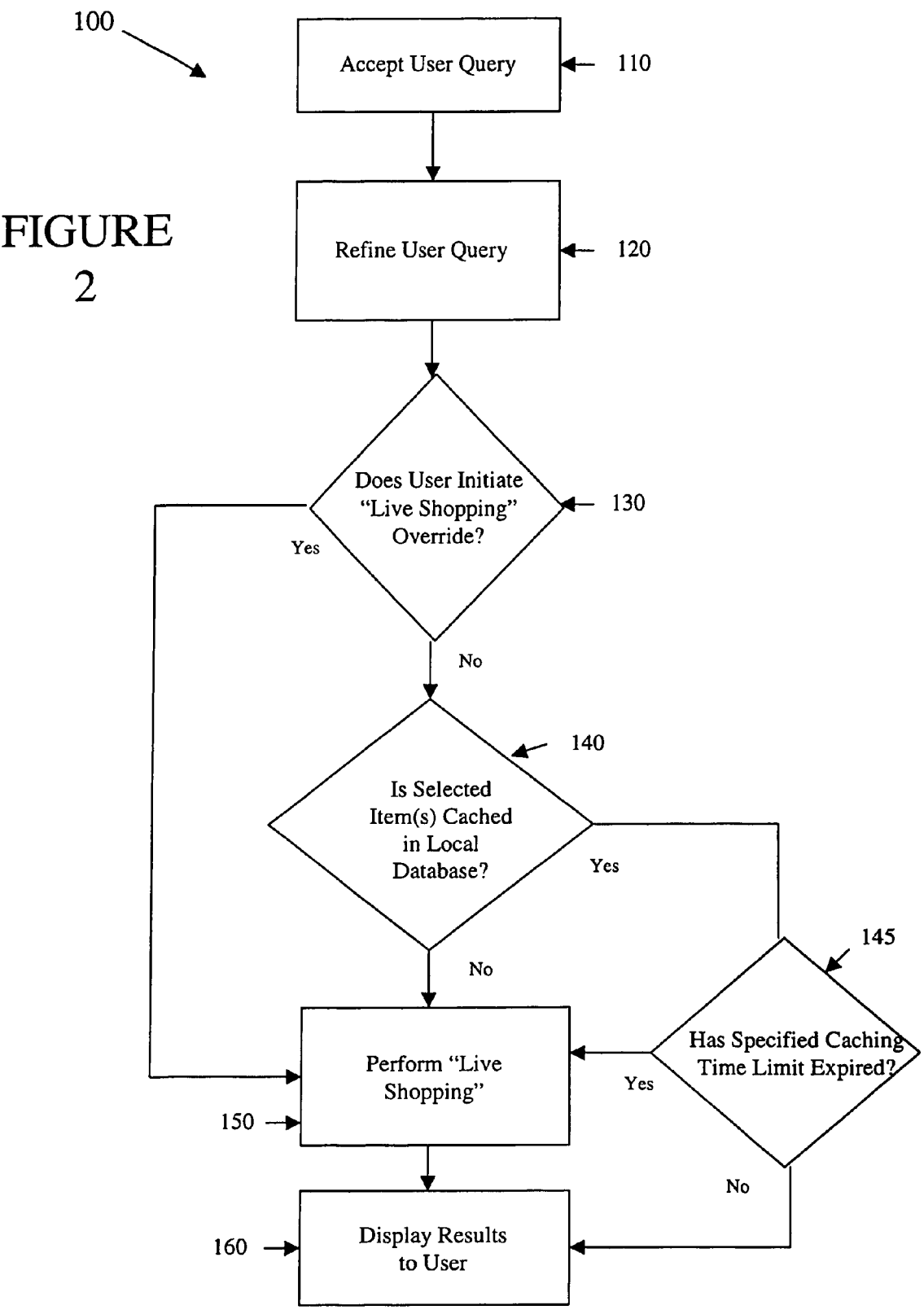
FIG. 2 is a flowchart describing a method for efficiently searching e-commerce websites over the Internet.

With reference now to FIG. 2, there is illustrated a flow chair of a method, generally designated by the reference numeral 100, for efficiently searching e-commerce website(s) 59 for item and promotional information over the Internet. The method preferably includes: accepting a user query 110; refining the user query 120; determining whether a user has initiated a "live shopping" override 130; if the user has not initiated the override, determining whether information pertaining to a selected item(s) is cached in the local database 74 (step 140); determining whether a caching time limit has expired 145; if the information is not cached in the local database 74 or the user has initiated the override, performing "live shopping" 150; and displaying search results to the user 160.

Figure 3:
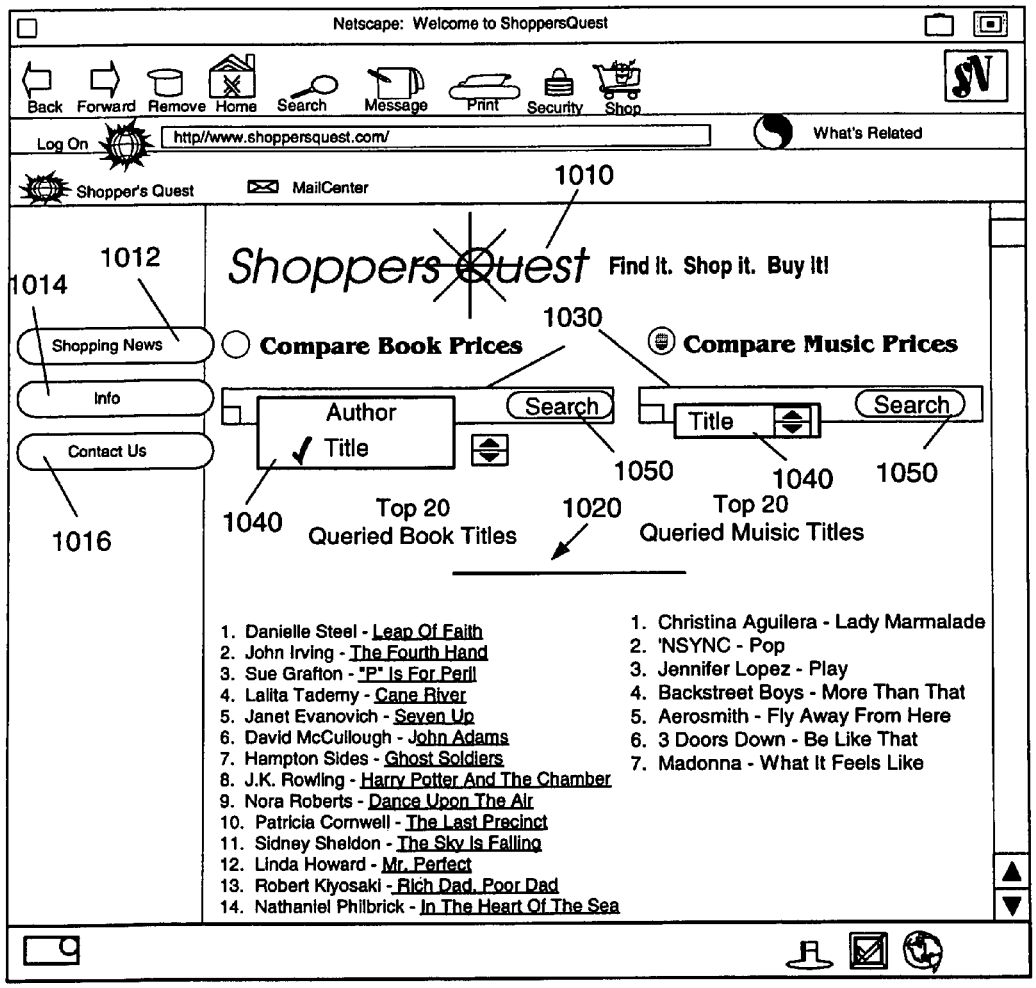
FIG. 3 is an illustration of a webpage interface for accepting user queries.

The accept user query step 110 preferably includes a user entering a query at the user machine 38 for item information, e.g., the item price, or promotional information through a user interface. FIG. 3 illustrates a preferred user interface. User interface webpage 1000 is a webpage that is generated by the base server 76 and is displayed at the user machine 38. User interface webpage 1000 may include a logo 1010, a shopping news/promotional information request button 1012, a service information button 1014, a contact information button 1016, a list(s) of popular items 1020, a query entry window 1030, a search-type pop-up window 1040, and a search activate button 1050.

The user initiates a search for item information by entering a search term in query entry window 1030. The user can select search-type pop-up window 1040 in order to indicate the search term's field. For example, if the item of interest is a book, the search term could be the book's title or the book's author. Choosing the correct search term field allows the interactive shopping system 30 to narrow the focus of the search and to conduct the search for item information more efficiently. The user can then initiate the search procedure by selecting search activate button 1050.

Alternatively, the user can select an item from the list(s) of popular items 1020 rather than entering a search term in the query entry window 1030. If the user wishes to search for promotional information, the user can select the shopping news/promotional information request button 1012. The procedure for searching for promotional information is described below in conjunction with FIGS. 12-16.

The refine user query step 120 preferably includes the base server 76 checking the local database 74 to determine whether any matches to the search term exist within the local database 74. Any matching items that are found are then displayed to the user. The user can then select from any of the returned matching items thus allowing the interactive shopping system 30 to conduct a subsequent search for item information more efficiently. The refine user query step 120 is shown and described with more detail with reference to FIG. 4 below.

Figure 9:
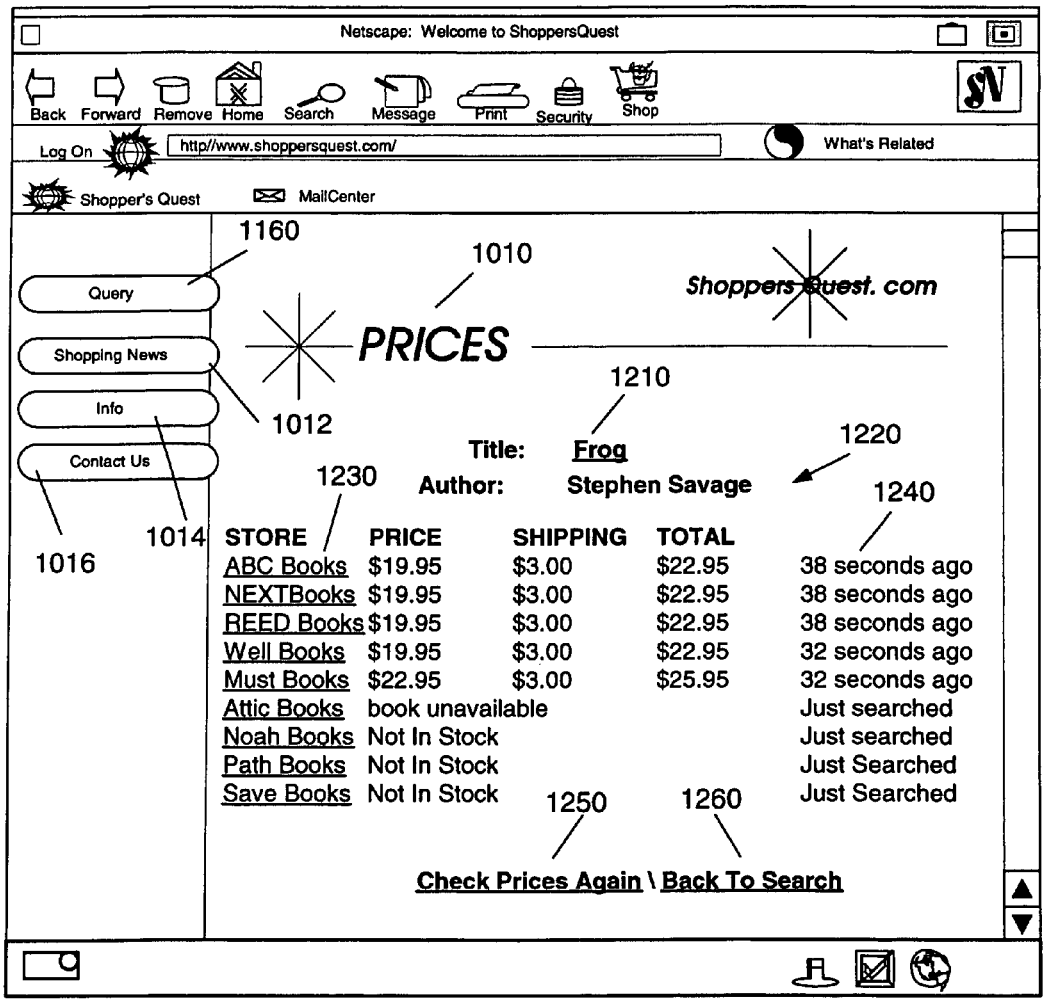
FIG. 9 is an illustration of a webpage displaying price search results.

Step 130, i.e., determine whether a user has initiated a "live shopping" override, preferably includes the base server 76 determining whether the user has chosen to have the base server 76 perform "live shopping" regardless of whether information related to the selected item(s) is cached in the local database 74. The user can initiate the override by selecting an override button such as user override button 1250, as seen in FIG. 9 and described in more detail hereinbelow. If the user chooses the override, the base server 76 performs "live shopping" step 150. If the user does not choose the override, then base server 76 checks the local database 74 for information related to the selected item, step 140.

Step 140, i.e., determine whether information pertaining to a selected item(s) is cached in a local database 74, preferably includes the base server 76 checking the local database 74 for whether the requested item information, e.g., the price of the item, has been cached by the local database 74 within a specified caching time limit. The caching time limit is a variable that is set dynamically depending on Internet congestion. The more congested the Internet is at a particular time, the less frequently the item information in local database 74 will be updated.

Caching item information in the local database 74 allows the base server 76 to preserve Internet bandwidth by enabling the base server 76 to avoid having to actively search the e-commerce website(s) 59 every time a user sends a query to interactive shopping system 30. Instead, the base server 76 determines if the information concerning the selected item(s) has already been retrieved from the e-commerce website(s) 59, i.e., during a prior user query request, and cached by the local database 74 at some time within the specified caching time limit. For example, users may frequently search for prices on a popular book title. If users check for the price of the book title every 10 seconds, Internet congestion would increase severely if active searches of the e-commerce website(s) 59 over the Internet were made in each instance. By checking the local database 74 for the price information instead of performing an active search, the base server 76 can save Internet bandwidth. The base server 76 can inform the user of the time since the item information was last updated within the local database, as illustrated by a time of last update field 1240, described hereinbelow in connection with FIG. 9.

Since the caching process avoids adding to Internet traffic and speeds the search results to the user, the base server 76 can also use a similar caching implementation to ease the daily workload of the base server 76, or more particularly, the sub-server farm 78, which performs the actual searching of the e-commerce website(s) 59, as is described below. Nightly or periodically, the sub-server farm 78, which includes a plurality of sub-servers 59 (FIG. 7), sends out the sub-servers 59 to search out and cache information regarding certain items, e.g., the prices for the top 20 book and music titles. This information is used to populate the list(s) of popular items 1020 (FIG. 3).

The number of items included in list(s) of popular items 1020 is arbitrary and is determined based on the amount of queries each item cached in the local database 74 receives during a certain time period, e.g., during a single day. If, for example, the population of list(s) of popular items 1020 is limited to 2000 items, each night or periodically sub-servers 59 will cache the prices of all 2000 items in the local database 74. The prices, or other information, will remain in the local database until the next night's purge and re-cache of information. In effect, the base server 76 guarantees that it will refresh the list(s) of popular items 1020 nightly, although a user can always refresh the list on command by initiating a user override.

Step 145, i.e., determine whether a caching time limit has expired, preferably includes the base server 76 checking whether or not the time since the item information cached in the local database 74 was last updated exceeds the caching time limit. The caching time limit can be stored in the memory 62, the secondary storage 63, or even in the local database 74 of the base server 76 and can be updated as necessary to reflect current Internet conditions, as described previously. Base server 76 can use a system clock (not shown) within processor 72 to keep track of the time that has elapsed since the local database 74 was last updated. If the information pertaining to the selected item(s) is not cached in the local database 74, has not been re-cached within the caching time limit, or the user initiates an user override, the base server 150 performs "live shopping", step 150.

The perform "live shopping" step 150 preferably includes the base server 76 transmitting a search request to the sub-server farm 78 and hence to the plurality of sub-server(s) 79. The sub-server(s) 79 act as "bots", gathering information from the e-commerce websites(s) based on the user query. If the sub-server 79 currently receiving the request is busy responding to a previous search request, the base server 76 transmits the search request to the next sub-server 79 in the sub-server farm 78 and then the next until a suitably non-stressed sub-server 79 can handle the search request. This process will typically take only a few 100ths of a second. The non-stressed sub-server 79 receives the search request and sends the search request to the sub-server's 79 assigned e-commerce website(s) 59. If a particular assigned e-commerce website 59 does not respond to the search request within 30 seconds, the sub-server 79 ends the request to that assigned e-commerce website 59, although the search request is maintained with respect to any other assigned e-commerce website(s) 59. Once the assigned e-commerce website(s) 59 responds to the search request, the sub-server 79 analyses the assigned e-commerce website(s) 59 for the information requested by the user query. Once searches for all selected items have been completed, the sub-server 79 sends the requested information to the base server 76. The base server 76 then updates the local database 74 with the information as described previously. The perform "live shopping" step 150 is shown and described in more detail with reference to FIG. 6 below.

The display results to the user step 160 preferably includes the base server first receiving the requested information from the sub-server farm 78. Alternatively, if the requested information was properly cached within the local database 74, the requested information is retrieved from the local database 74. In the situation where item price information was retrieved, the base server 76 arranges the prices for a specific selected item, preferably from lowest to highest. Alternatively, the base server can arrange the selected item prices from highest to lowest or in some other arrangement. The base server 76 then associates the item information with the e-commerce website 59 from which the information was retrieved. Finally, the base server 76 creates an HTML webpage, or alternatively a webpage in XML or some other suitable language, and displays a search result webpage 1200 (FIG. 9). The display results to the user step is shown and described with more detail with reference to FIG. 8 below.

B. Refining a User Query

Figure 4:
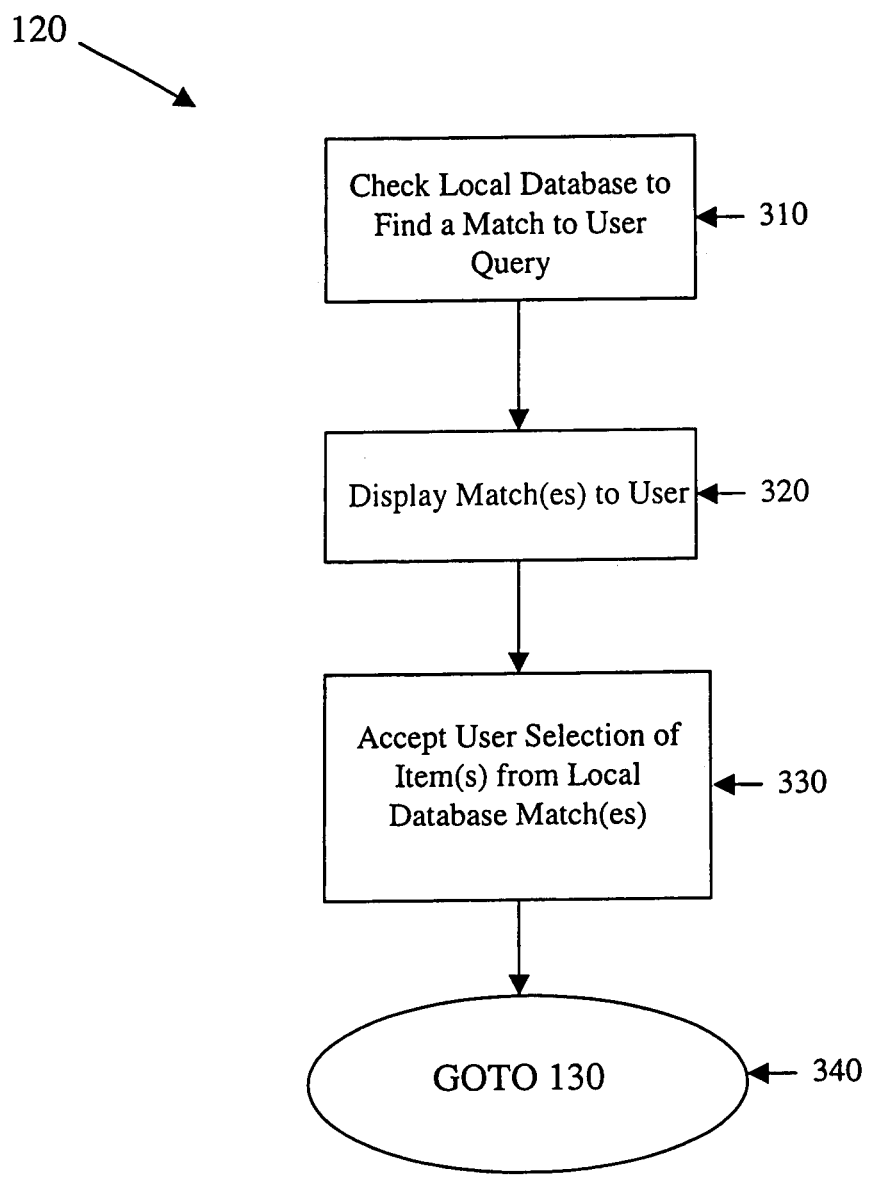
FIG. 4 is a flowchart describing a method for allowing a user to refine a query.

With reference now to FIG. 4 of the Drawings, there is illustrated a flowchart describing a preferred method, generally designated therein by the reference numeral 120, for refining the user query after the user initiates a search as described above. The method 120 preferably includes: checking the local database 74 to find a match to the user query 310; displaying any matches to the user 320; accepting user selection of item(s) from the local database 74 matches 330; and returning to the main method 100 (step 340.)

Once the user has entered the user query in the query entry window 1030 of the user interface webpage 1000, as illustrated in FIG. 3, the base server 76 checks 310 the local database 74 to find an item or items that matches to any search terms used in the user query. The primary goal of searching the local database 74 for matching items is to narrow the user query to the most specific piece of information in the local database 74. The more narrow the query, the more success the base server 76, or alternatively the sub-servers 79, will have in finding the correct item information, e.g., the correct price information. For example, if on the user interface webpage 1000, the user enters the word "Frog" into the query entry window 1030, the base server 76 will search the local database 74 for all instances of the word "Frog" in any of the local database's 74 indexed title fields. In an alternative embodiment the user can choose to limit the number of returns from the local database 74 by, for example, entering the number of returns the user wishes to retrieve.

Figure 5:
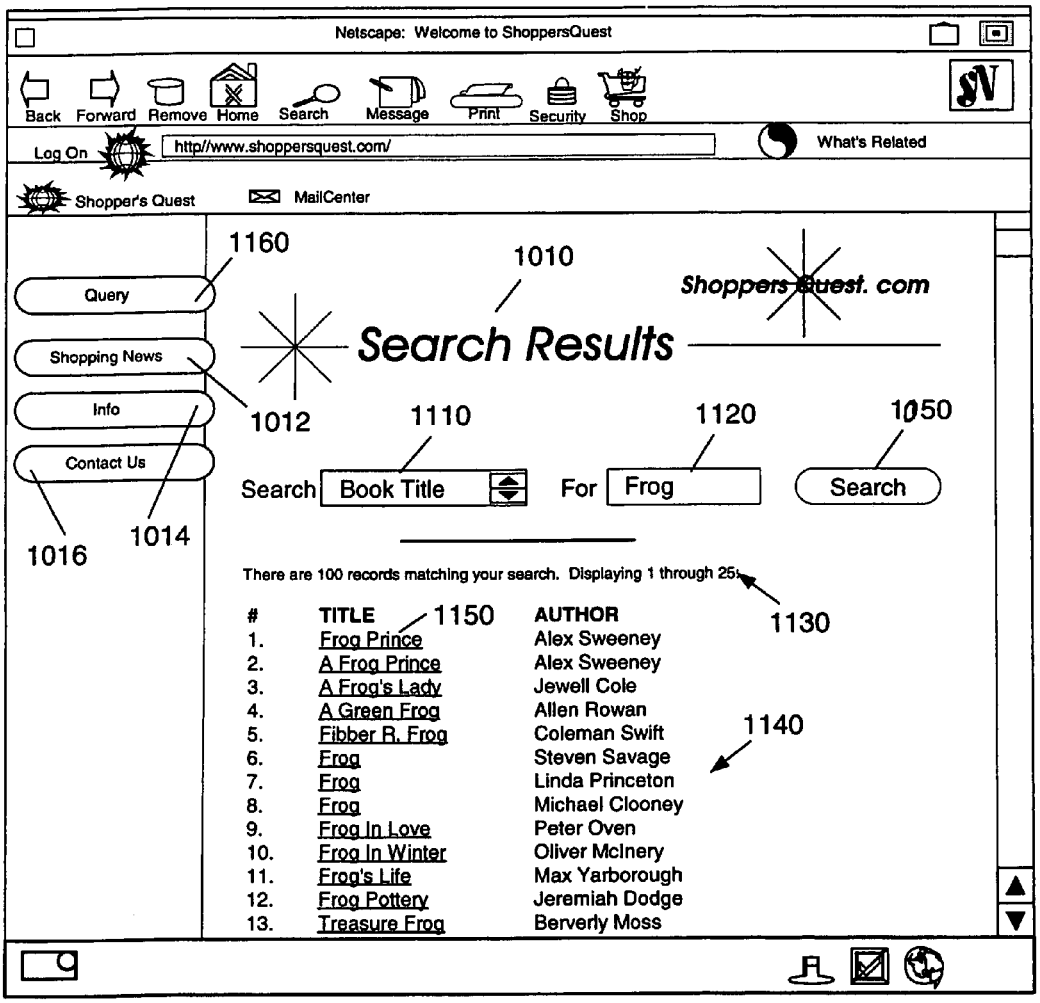
FIG. 5 is an illustration of a webpage displaying initial search results of a user query from which the user may refine the query.

The base server 76 displays 320 any matches found in the local database 74 to the user by way of a search results webpage 1100, as illustrated in FIG. 5. Search results webpage 1100 is a webpage that is generated by the base server 76 and is displayed at the user machine 38. Search results webpage 1100 may include search-type indicator pop-up menu 1110, search term indicator window 1120, number of returns indicator 1130, results list 1140, search activation link 1150 and query request button 1160 as well as features included in the user interface webpage 1000, i.e., a logo 1010, the shopping news/promotional information request button 1012, the service information button 1014, the contact information button 1016, and the search activate button 1050.

The search-type indicator pop-up menu 1110 displays the search term field the user selected when entering the user query. The search term indicator window 1120 displays the search term(s) the user entered into the query entry window 1030. The number of returns indicator 1130 displays the number of matches the base server 76 located in the local database 74 as well as the number of matches currently being displayed. The results list 1140 displays the item(s) located in the local database 74 that contained at least one term matching the search term(s). In FIG. 5, a list of book titles containing the word "Frog" is displayed.

The item name, or in this example, the book title, is listed as search activation link 1150. By selecting the search activation link 1150 associated with a particular item, the user indicates that the selected item is the item about which the user wishes the base server 76 to display information. For example, by clicking on one of the items listed in the results list 1140, the user can initiate a price search for that particular item. Alternatively, the user can enter another search term in search term indicator window 1120, which can double as query entry window 1030, and thus reinitiate the local database 74 search for matching items. Refine user query method 120 then returns to the main method 100 in step 340.

If the local database 74 contains no matches to the user query either because the local database does not contain information on the requested product or because the user entered erroneous information, the base server 76 displays "as close as possible" matches gathered from the local database 74. If the user sees that nothing in the results list 1140 matches the user's query, the user then has the option of adding the requested item to the local database 74. In an alternative embodiment, a link (not shown) at the bottom of the search results webpage 1000 can read, "If we can't find it, tell us what you're looking for and we'll hunt it down for you."

A query field for the user's description of the desired item can accept a variety of descriptive terms. For example, a user can enter the following information: "That book that was banned by the government in 1920 or 1930. It was written by an Irish guy names James." The book in question in this example is, of course, *Ulysses* by James Joyce but the user, lacking the name of the book and the full name of the author, would be at a loss to find the novel in the local database 74 using a user query. Using the description provided by the user, an editorial staff can the find the appropriate title and send an e-mail to the user with the link to the title (or a link to a newly-created shopping list custom made for the user). If the descriptive title is not in the local database 74, the editorial staff may add the title to the local database 74 based on a user's recommendation. For a user's recommendation to be valid, the user must provide a valid e-mail address. The e-mail address allows the editorial staff to communicate to user that the title has been successfully added to the local database 74.

C. "Live Shopping"

Once the user has refined the user query, as described above, the base server 76 is ready to gather the item information the user has requested. If the item information has been properly cached by the local database 74, the base server 76 retrieves the item information from the local database 74, as described previously. However, if the information pertaining to the selected item(s) is not cached in the local database 74, has not been re-cached within the caching time limit, or the user initiates a user override, the base server 76 performs the "live shopping" method illustrated in FIG. 2 discussed hereinabove, and generally designated by the reference numeral 150 in FIG. 6.

Figure 6:
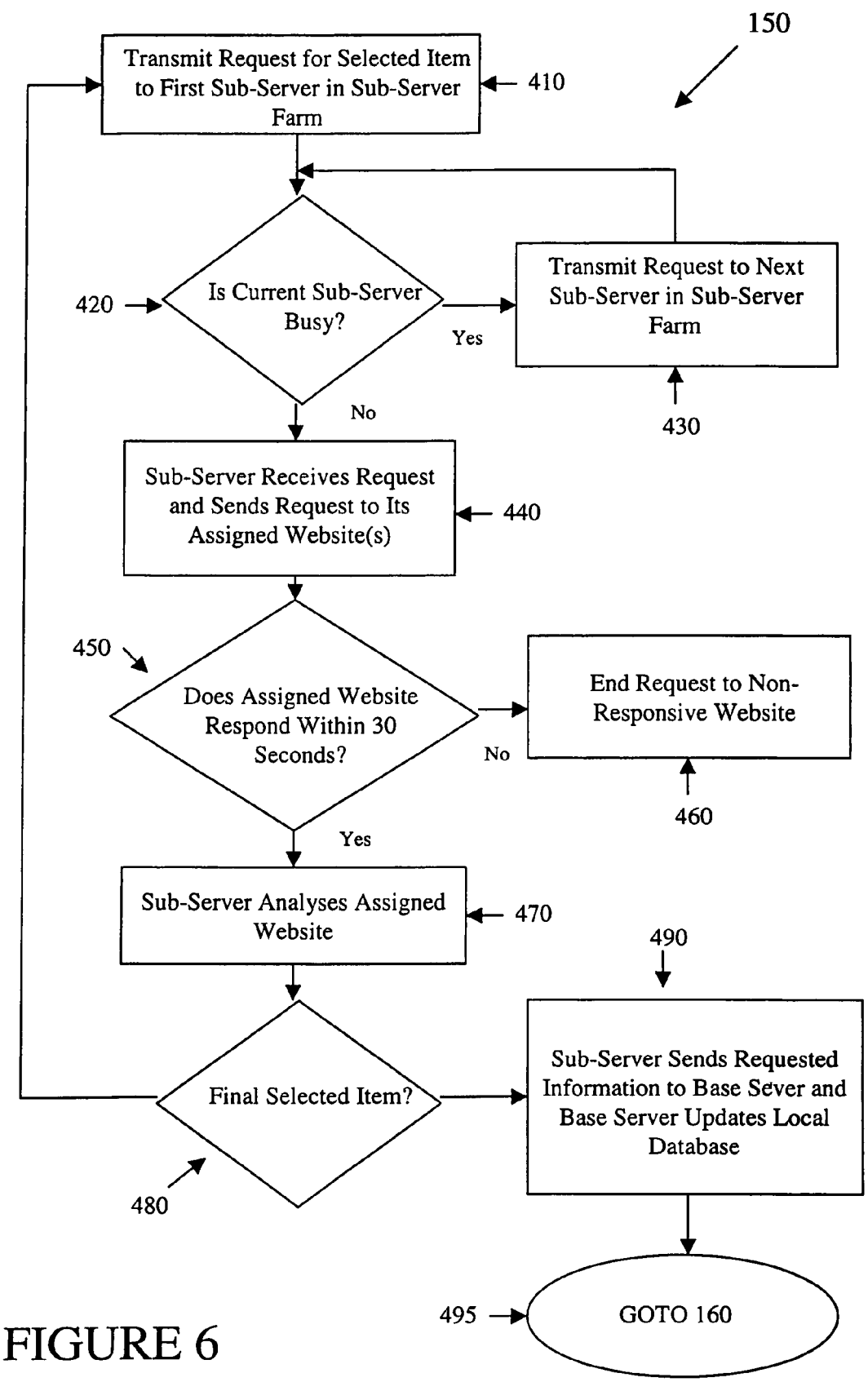
FIG. 6 is a flowchart describing a method for performing "live shopping" of e-commerce websites over the Internet.

The "live shopping" method 150, as illustrated in FIG. 6, preferably includes: transmitting a search request for the selected item information to the first sub-server 79 in the sub-server farm 78 (step 410); determining whether the current sub-server 79 is busy 420; if the current sub-server 79 is busy, transmitting the search request to the next sub-server 79 in the sub-server farm 430; if the current sub-server 79 is not busy, the sub-server 79 receiving the search request and sending the search request to its assigned e-commerce website(s) 59 (step 440); determining whether an assigned e-commerce website 59 responds to the search request within 30 seconds 450; if an assigned e-commerce website 59 does not respond to the search request within 30 seconds, terminating the search request to the non-responsive e-commerce website 59 (step 460); if an assigned e-commerce website 59 does respond to the search request within 30 seconds, the sub-server 79 analyzing the assigned e-commerce website 59 (step 470); determining whether information pertaining to the final selected item has been retrieved 480; if the information for the final selected item has been retrieved, the sub-server 490 sending the requested information back to the base server 76 and the base server 76 updating the local database 74 (step 490); and returning to the main method 100 (step 495).

In other words, the base server 76 transmits 410 the search request for information pertaining to the selected item(s) to the sub-server farm 78, which delivers the request to the first sub-server 79. If that particular sub-server 79 is busy handling a previous request 420, the search request is transmitted 430 to the next sub-server 79 in the sub-server farm 78. If that sub-server 79 is busy, the next sub-server 79 is sent the search request, and so on, until a suitably non-stressed sub-server 79 can handle the search request. Ideally, the process of finding an available sub-server 79 should only take a few 100ths of a second.

The available sub-server(s) 79 receives 440 the search request and sends the search request to the sub-server's 79 assigned e-commerce website(s) 59. More than one sub-server 79 can be used to process a particular search request and a particular sub-server 79 can be assigned to more than one e-commerce website 59. For example, with reference now to FIG. 7, there is illustrated a preferred process, generally designated therein by the reference numeral 440, for multiple sub-servers 79A-79E transmitting simultaneous, multi-threaded requests to assigned website(s) 59A-59G, as illustrated therein by the arrows. The sub-server(s) 79 use a search function to address and check each assigned e-commerce website 59. This function allows the sub-server(s) 79 to dynamically create an e-commerce website's URL that takes the sub-server(s) 79 directly to the item information webpage of the e-commerce website 59.

Once the sub-server(s) 79 has sent the search request to the assigned e-commerce website(s), the sub-server(s) 79 keeps track of how long it takes a particular assigned e-commerce website 59 to respond to the search request 450. If an assigned e-commerce website 59 responds slowly, i.e., takes more than 30 seconds to response, or if the Internet itself is too congested, the sub-server(s) assumes that assigned e-commerce website is unavailable for searching and terminates 460 the search request to that particular assigned e-commerce website 59.

When an assigned e-commerce website 59 does respond to a search request, the sub-server(s) 79 analyses 470 the assigned e-commerce website 59. The sub-server(s) 79 analyses the assigned e-commerce website(s) 59 utilizing the e-commerce website's 59 HTML structure to determine the location of the requested information, e.g., the location of the price of the selected item. The sub-server(s) 79 then extracts the information from the assigned e-commerce website(s) 59. The sub-server(s) 79 then determines 480 whether information pertaining to the final selected item has been retrieved. If there are no more selected items for the sub-server(s) 79 to search for, the sub-server(s) 79 sends 490 the requested information back to the base server 76 and the base server 76 uses the information to update the local database 74 cache. "Live shopping" method 150 then returns 495 to the main method 100 shown in FIG. 2.

D. Displaying Search Results to the User

Figure 8:
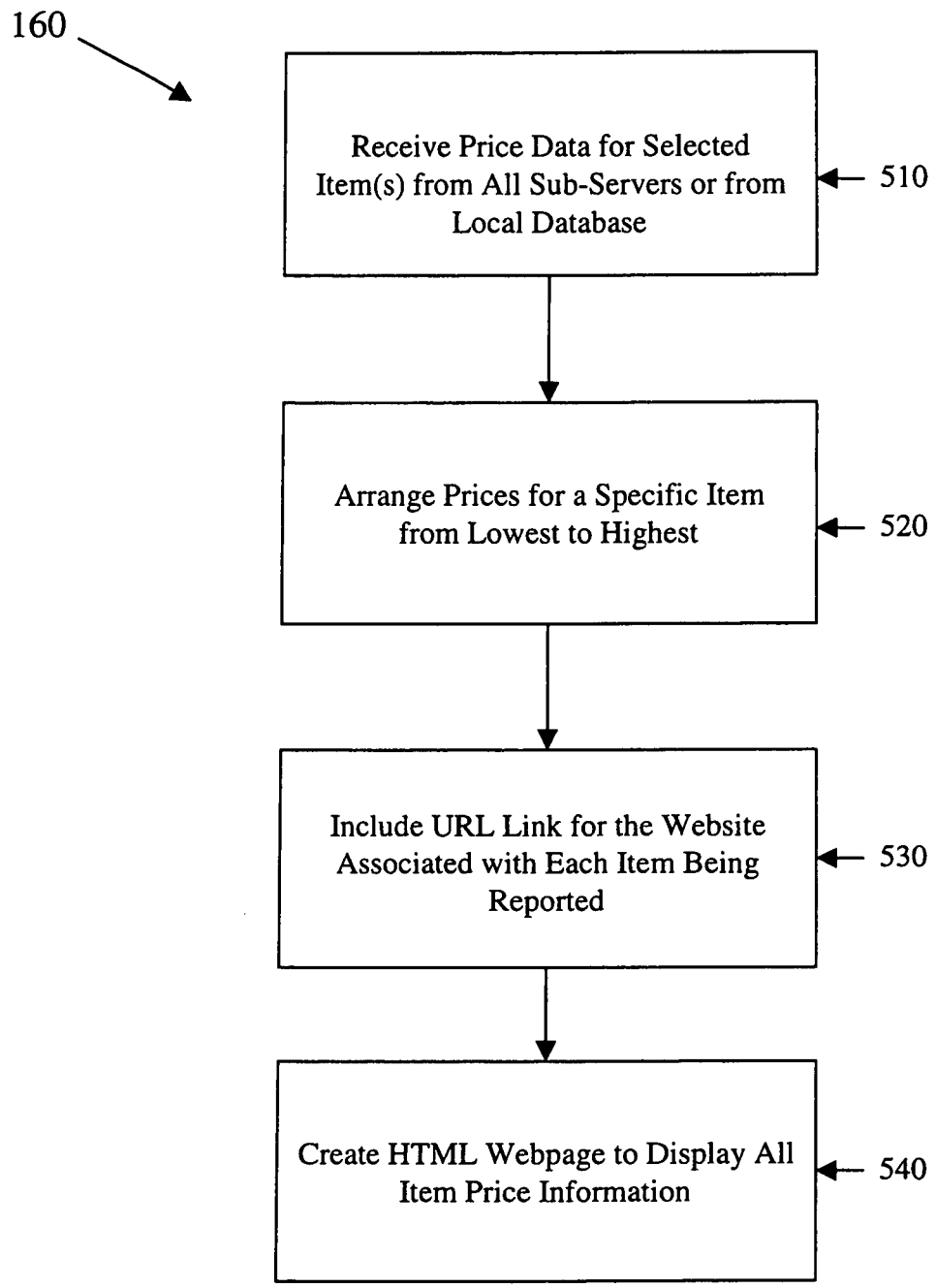
FIG. 8 is a flowchart describing a method for displaying search results to the user.

Once all the requested item information, e.g., price data, is retrieved from the local database 74 cache or is collected from all of the e-commerce websites 59, the base server 76 creates an HTML webpage that displays the item information to the user. Where the item information is price data, the display webpage can list the selected item(s), for example, in order from lowest price to highest price, thus enabling the user to more easily choose the best bargain. With reference now to FIG. 8, there is illustrated a display method, generally designated by the reference numeral 160, which preferably includes: receiving price data for the selected item(s) from all sub-servers 79 or from the local database 74 cache 510; arranging the prices for a specific selected item from lowest to highest 520; including the URL link for the e-commerce website 59 associated with each item being reported 530; and creating an HTML webpage to display all of the item price information 540.

After the base server 76 has retrieved 510 the price data from either the local database 74 cache or from the sub-server farm 78, the base server arranges 520 the price data. Preferably the price data for the selected item(s) is arranged from lowest to highest since the user will usually be most interested in find the lowest possible price for the selected item(s). However, other arrangements are of course possible. For example, the price data could be arranged from highest price to lowest price or the price data could be arranged alphabetically according to the name of the e-commerce website 59 from which the price data was garnered.

Once the item information has been arranged, the base server 76 includes 530 the URL link for the e-commerce website(s) 59 associated with the particular item information for each item being reported. Therefore, if the user decides to purchase a particular item based on the reported information, the user simply has to select the URL for that e-commerce website 59 and will be taken directly to the correct screen of the e-commerce website 59 for purchasing the item.

The base server 76 reports the requested information by creating 540 an HTML webpage, or alternatively a webpage in XML or some other suitable language, to display all of the item information. FIG. 9 illustrates a preferred price results webpage 1200. The price results webpage 1200 can include an item field 1210, an ordered price search results list 1220, a hypertext link 1230 to an e-commerce website 59, a time of last update field 1240, the aforementioned user override activation button 1250, and a return to query page button 1260.

The item field 1210 displays the item name, in this example the book title, of the selected item. The ordered price search results list 1220 displays the list of the e-commerce website(s) 59 that sell the selected item, the price of the item at a particular e-commerce website 59 (arranged in this example from lowest to highest), the shipping cost of the item from the particular e-tailor, and the total price. The display of the e-commerce website 59 is shown as a hypertext link 1230 which enables the user to connect directly to that e-commerce website 59 if the user decides to purchase the selected item from that e-commerce website 59. The ordered price search results list 1220 can also include a time of last update field 1240, which displays to the user how long it has been since the local database 74 cache was last updated with that particular item information from that particular e-commerce website 59.

The price results webpage 1200 can also include a user override activation button 1250. The user override activation button 1250 allows the user to initiate a new "live shopping" search of the e-commerce website(s) regardless of how recently the item information has last been cached in the local database 74. This can be useful if a user wants the latest up-to-date price information on an item. Finally, the return to query page button 1260 allows the user to return to the user interface webpage 1000 (see FIG. 3) to begin a new user query.

E. Bulk-shopping

Figure 10:
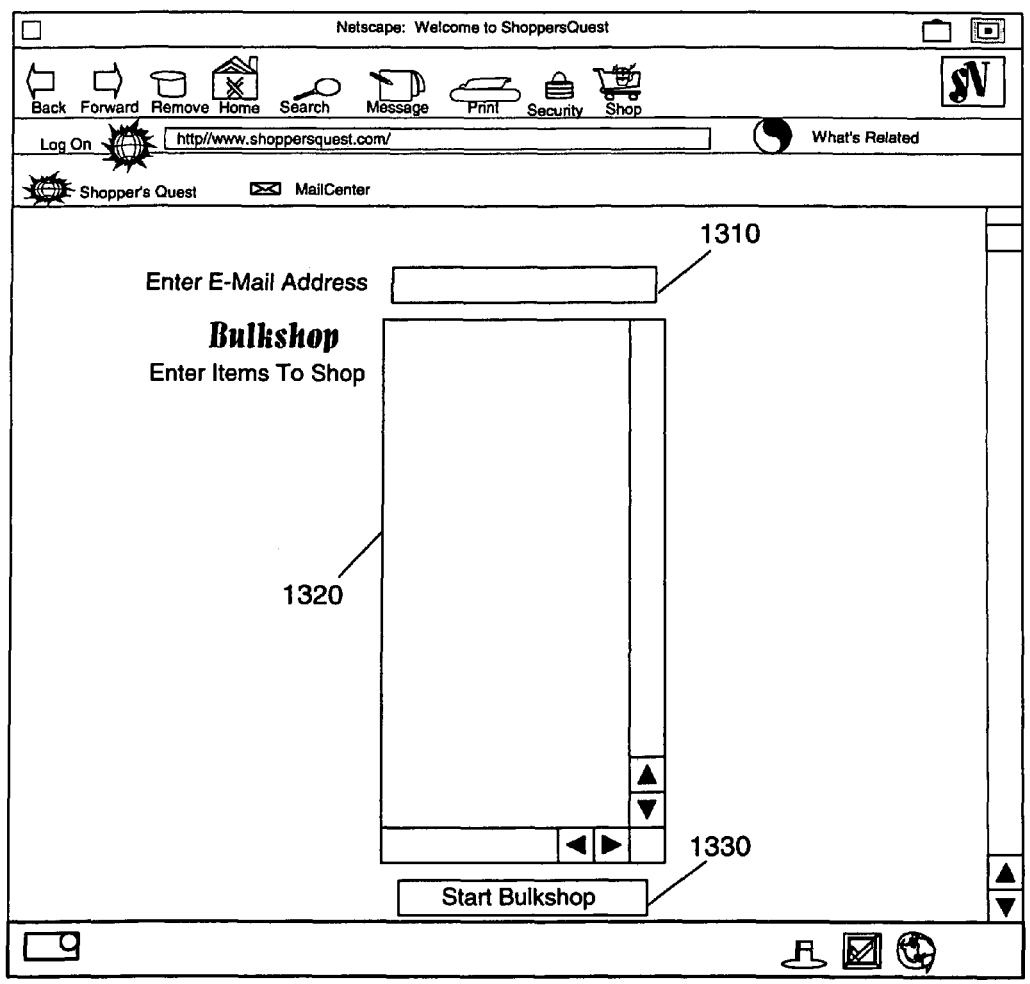
FIG. 10 is an illustration of a webpage interface for accepting a user bulk-shop query.

In some instances, a user may wish to search for item information for many items at once rather than entering one item at a time using user interface webpage 1000. With reference now to FIG. 10, there is illustrated a bulk-shopper interface webpage 1300. The bulk-shopper interface webpage 1300 preferably includes a user e-mail address entry window 1310, an item selection window 1320, and a bulk-shopper activate button 1330.

The user types in an e-mail address into the user e-mail address entry window 1310. This will be the e-mail address to which a search report will be delivered. The user then can drag or paste in as many items as the user wishes to find information for, i.e., several hundred or several thousands of item identification numbers (ISBN for books, UPC for music, etc.). As the bulk-shopper function will most likely be used by retailers rather than casual consumers, the user retailer will have easy access to the proper item identification numbers. The user then selects the bulk-shopper activate button 1330 to initiate the search. The search procedure is identical to method 100 as described above. The only difference is how the search report is delivered.

Figure 11:
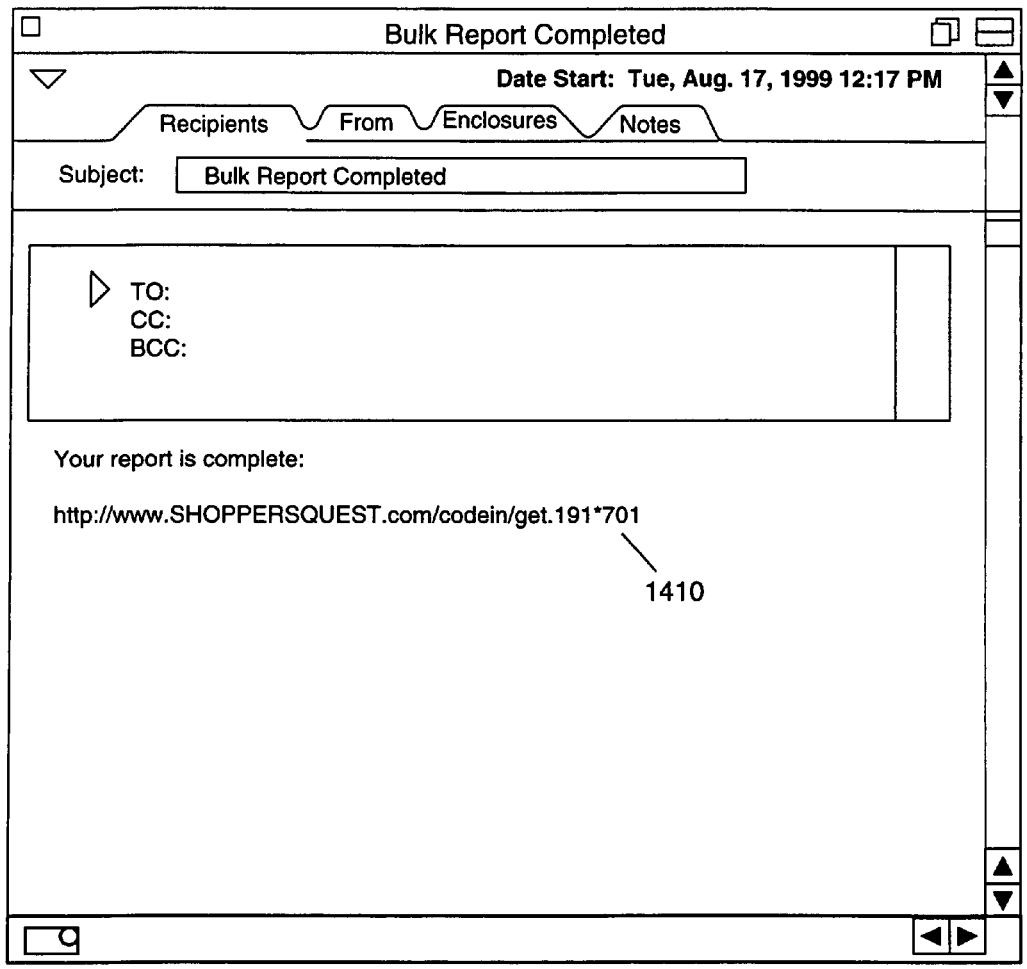
FIG. 11 is an illustration of an e-mail reporting the results of a bulk-shop request.

When the base server 76 has finished retrieving the item information from the local database 74 cache or from the sub-server farm 78, it will send the user a bulk-shop results e-mail 1400, as illustrated in FIG. 11. The bulk-shop results e-mail 1400 includes a link 1410 to the price results webpage 1200. In this situation, the price results webpage 1300 will be laid out as a spreadsheet displaying the shopping results, complete with shipping information, hypertext links 1230 to the e-commerce websites, and time of last update fields 1240. The price results webpage 1200 is sent to the user in the bulk-shop results e-mail 1400 because it may take the base server 76 some time to process the user's entire query. Sending the link in an e-mail prevents the user from having to sit at his or her computer waiting for the search results to be displayed. The user can instead click on the link 1410 to the price results webpage 1400 at his or her leisure.

In an alternative embodiment, the base server 76 can keep a webpage active with the user's current "cart" of queried items. Users can monitor prices or other information on a variety of items on their own personalized shopping page. The information on these pages is updated automatically every evening or alternatively at an update rate specified by the user, i.e., by using the override button 1250 (FIG. 9).

F. Shopping News and Promotional Information

As intelligent agents like "bots" become more and more prevalent on the Internet, consumers begin to distance themselves from content on e-commerce websites, relying on the automatic agent to do most of their trivial or mundane searching for them. The operation of the interactive shopping system 30 described above falls into this category, enabling a user to comparison shop the entire Internet within a few seconds.

This, however, misses the point of content-rich e-commerce websites. The goal of these e-commerce websites is to not only offer competitive prices but to also offer interesting and informative content to engage shoppers, keep them at the e-commerce website longer than at a competitor's website, and to compel the shoppers to return again and again. Since the purpose of interactive shopping system 30 is to offer a fundamentally holistic tool to aid the shopper's experience on the Internet and ease the overwhelming burden of information available to users, the interactive shopping system 30 must not only contain a tool to divine competitive prices but interactive shopping system 30 must also contain a tool to aggregate and sort through the variety of interesting and compelling e-commerce content.

When the user wishes to retrieve and view shopping news or promotional information, the user can select the shopping news/promotional information request button 1012, from the user interface website 1000 (FIG. 3), for example. The base server can then retrieve the shopping news and promotional information (hereinafter "promotional information") preferably using one of three methods: information scraping, information sharing, or information input. Each of these method fits within the overall framework of method 100 with modifications to the perform "live shopping" step 150 and the display results to user step 160.

1) Information Scraping

Figure 12:
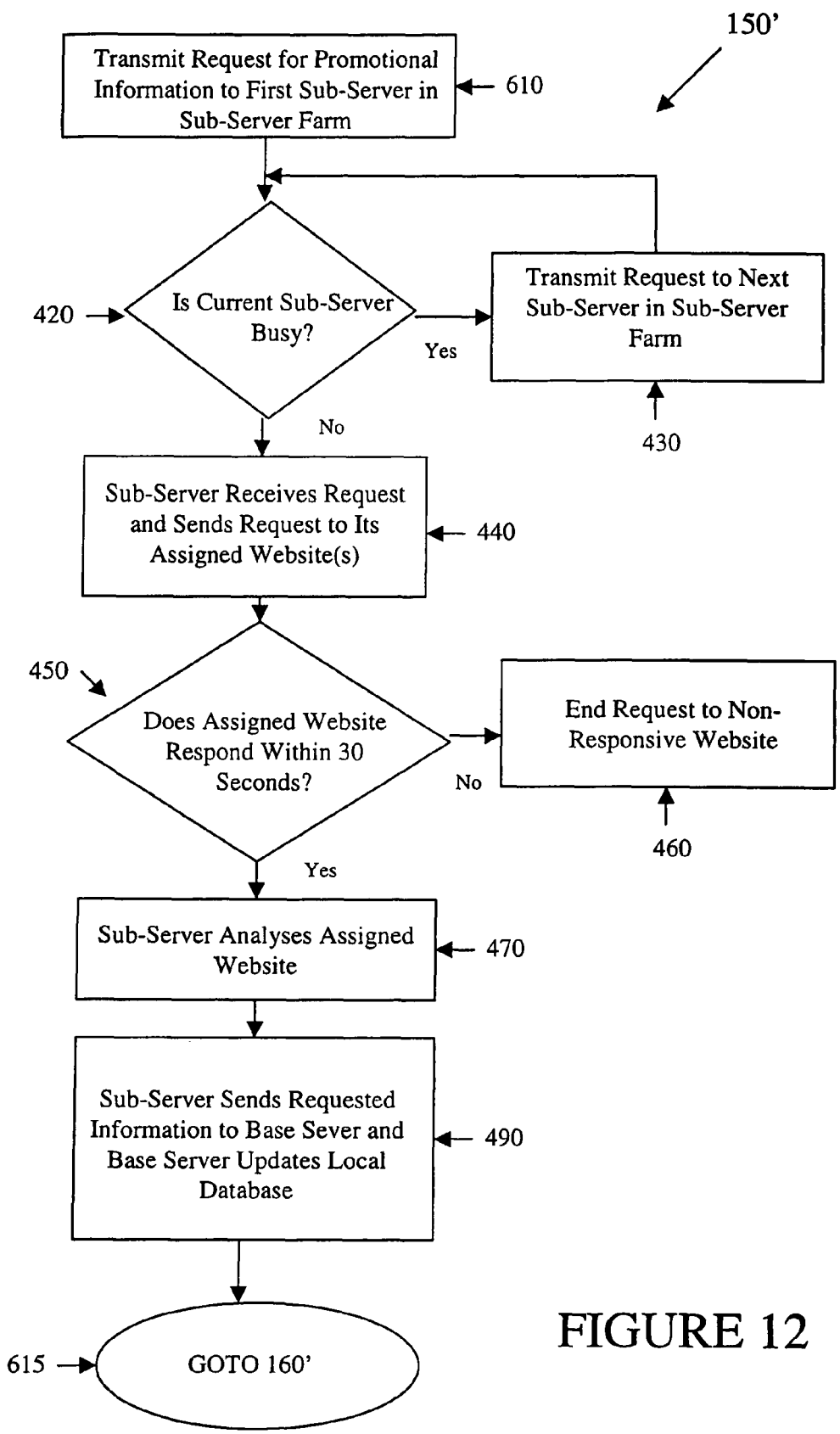
FIG. 12 is a flowchart describing a method for searching e-commerce websites for promotional information over the Internet.

With reference now to FIG. 12, there is illustrated a flow-chart for an information scraping method, generally designated therein by the reference numeral 150'. Information scraping method 150' preferably includes the steps utilized in "live shopping" method 150, with the addition of transmitting a search request for promotional information step 610 in place of transmitting a search request for selected item information step 410. Also, information scraping method 150' goes to modified display method 160' in step 615 rather than to the display method 160 which was described above.

The base server 76 gathers promotional information using the information scraping method 150' in a similar manner to how the base server 76 retrieves item information in "live shopping" method 150. The base server 76 transmits 610 the search request for promotional information to the sub-server farm 78. Once at least one suitably non-stressed sub-server(s) 79 is found, steps 420 and 430, the sub-server(s) 79 receives 440 the search request and sends the request to the assigned e-commerce website(s) 59 in the multi-threaded manner illustrated in FIG. 7. The sub-server(s) 79 determines 450 whether the assigned e-commerce website(s) 59 is responding to the search request and terminates 460 the search request to any assigned e-commerce website that does not respond within 30 seconds. The sub-server(s) 79 analyze 470 the assigned e-commerce website(s) 59 that does respond to the search request within the 30 second time limit, retrieves the requested promotional information, and sends 490 the requested promotional information to the base server 76 which in turn updates the local database 74 cache with the requested promotional information.

Figure 13:
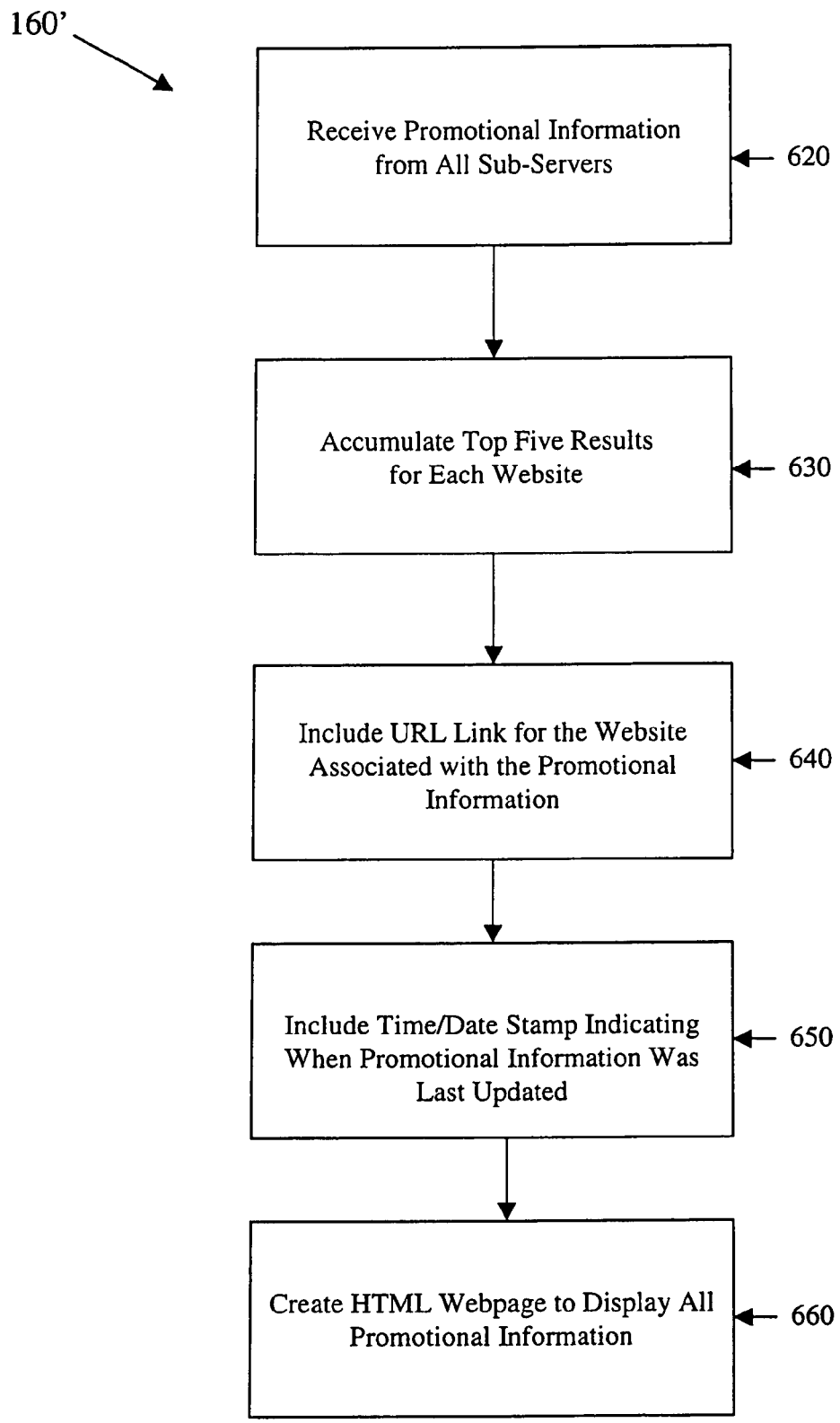
FIG. 13 is a flowchart describing an alternative method for displaying search results to the user.

With reference now to FIG. 13, there is illustrated a flowchart for a modified display method, generally designated therein by reference numeral 160', which can be used to display promotional information retrieved by information scrapping method 150'. Modified display method 160' can also be used to display promotional information retrieved by the information sharing and information input method, which will be described below.

Modified display method 160' preferably includes receiving the retrieved promotional information from the sub-server farm 78 (step 620), accumulating the top five results for each e-commerce website 59 (step 630), including the URL link for the e-commerce website 59 associated with a particular piece of promotional information 640, including a time/date stamp indicating when the promotional information was last updated 650, and creating an HTML webpage to display the promotional information 660.

Once the base server 76 receives 620 the retrieved promotional information from the sub-server farm 78, the base server accumulates 630 the top five results for each e-commerce website 59, based on either the time the promotional information was acquired or in order of importance as specified by the e-commerce website operators. The number of results, for example five, is completely arbitrary and may be set at any number. The purpose of limiting the number of results displayed from each e-commerce website 59 is to organize and catalog the content of the e-commerce website(s) 59 into a manageable distillation. By minimizing the load of information a user sees, the user can increase the amount of information he or she can view while retaining the ability of delving deeper into the content at will.

The base server 76 then includes 640 the URL link of the e-commerce website 59 associated with the promotional information. The URL link allows the user to easily access the pertinent e-commerce website 59 if the user wishes to see more information than is displayed by the base server 76. The base server 76 also includes 650 a time/date stamp indicating when the promotional information associated with a particular e-commerce website 59 was last updated. It is not necessary for base server 76 to update promotional information as often as it updates price information. Therefore, it is important to indicate to the user that the news he or she is viewing may be several hours or even a day or more old.

Figure 14:
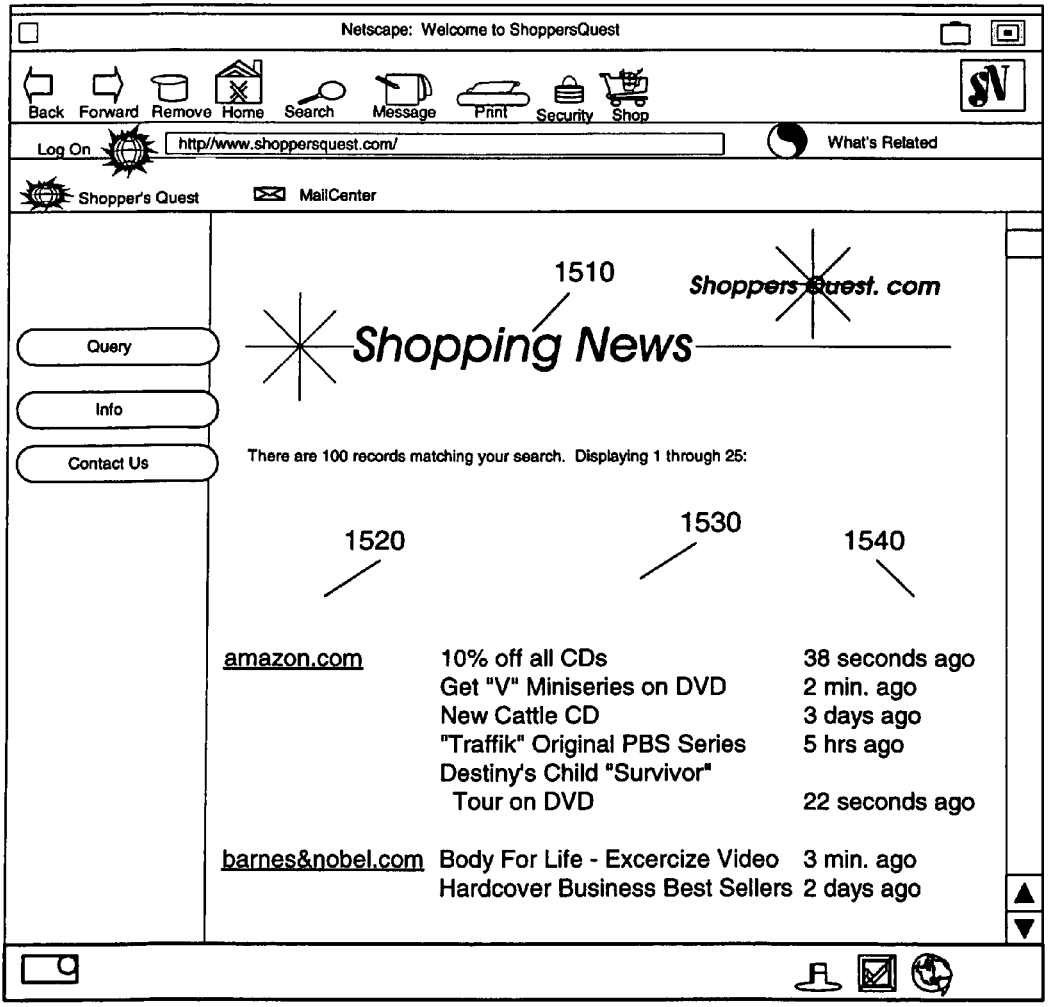
FIG. 14 is an illustration of a webpage displaying promotional information search results.

Finally, the base server creates 660 an HTML webpage, or alternatively a webpage in XML or some other suitable language, to display all of the promotional information. FIG. 14 illustrates a preferred promotional information webpage 1500. The promotional information webpage 1500 may include a logo 1510, a hypertext link 1520 to the e-commerce website 59 associated with the specific promotional information, a list of promotional information 1530, and a time of last update field 1540, as well as features typical to all of the webpages, i.e., the service information button 1014, the contact information button 1016, and the query request button 1160. The hypertext link 1520 allows the user to go directly to the e-commerce website 59 associated with the particular promotional information the user is interest in. As mentioned previously, the time of last update field 1540 indicates to the user how much time has past since the information displayed in the list of promotional information 1530 was last re-cached in the local database 74.

2) Information Sharing

Figure 15:
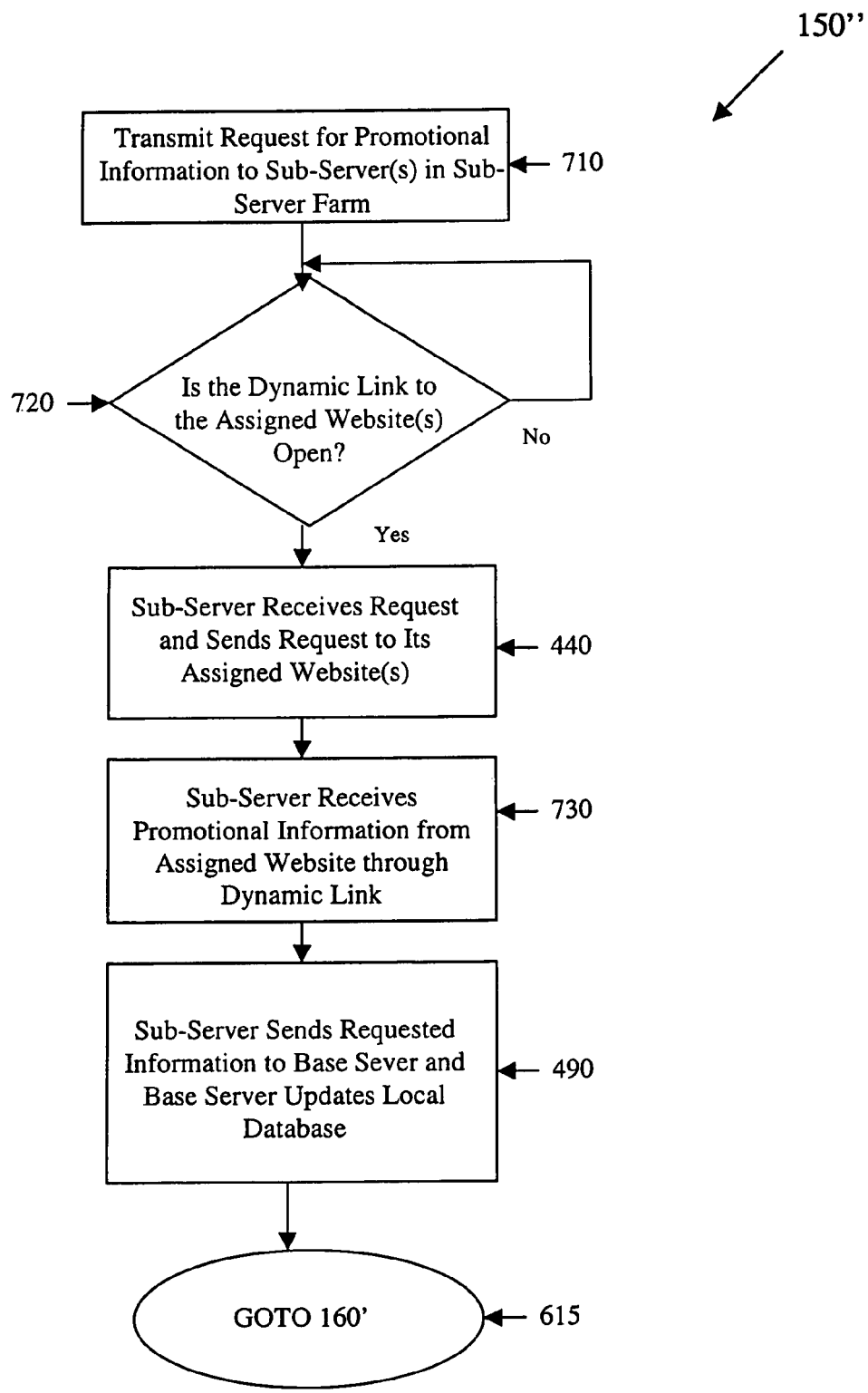
FIG. 15 is a flowchart describing an alternative method for searching e-commerce websites for promotional information over the Internet.

Information sharing is the interactive shopping system's 30 ability to dynamically update information from a direct data link to various e-commerce websites 59. This direct data link is open only at specific, agreed upon times when the sub-server farm 78 has the authority to query a foreign e-commerce website 59 directly. FIG. 15 shows a flowchart for information sharing method 150". Information sharing method 150", which is another modification of "live shopping method" 150, preferably includes: transmitting a request for promotional information 710; determining whether the dynamic data link to an assigned e-commerce website 59 is open 720; the sub-server(s) 79 receiving the request for promotional information and sending the request to the assigned e-commerce website 59 440; the sub-server(s) 79 receiving the promotional information through the dynamic data link 730; the sub-server(s) 79 sending the requested promotional information to the base server 76 which in turn updates the local database 74 cache with the retrieved promotional information 490; and going to modified display method 160'.

Once the base server 76 transmits 710 the request for promotional information to the sub-server farm 78, the sub-server 78 determines 720 whether the dynamic link to the assigned e-commerce website(s) is open. When the dynamic link opens at the specified, agreed upon time, the sub-server(s) 79 receive 440 the request for promotional information and sends the request to the assigned website(s) 59. The sub-server(s) 79 receive the promotional information from the various assigned e-commerce websites 79 through the dynamic data link. The dynamic data link can be maintained through a variety of methods that are built into the interactive shopping system 30, including HTML links, XML queries, or other methodologies that a partner e-commerce website recommends.

Once the information is received, the sub-server farm 78 sends 490 the requested promotional information to the base server 76 which then updates the local database 74 with the retrieved promotional information. The base server then displays the promotional information using modified display method 160' as described above.

3) Information Input

In the information input methodology, a partner e-commerce website has a secure data entry area, accessible by the sub-server farm 78, where the e-commerce website operators can type in as much contextual or information rich data as they would prefer. With this methodology, minimizing the amount of information that reaches the user becomes critical. Indeed, with the information input methodology, entire display webpages could be dedicated to just one partner e-commerce website. Although there is no limit to how much information the e-commerce website operators can enter, the base server 76 will continue to burrow through the information will limit the display of information as described previously.

Figure 16:
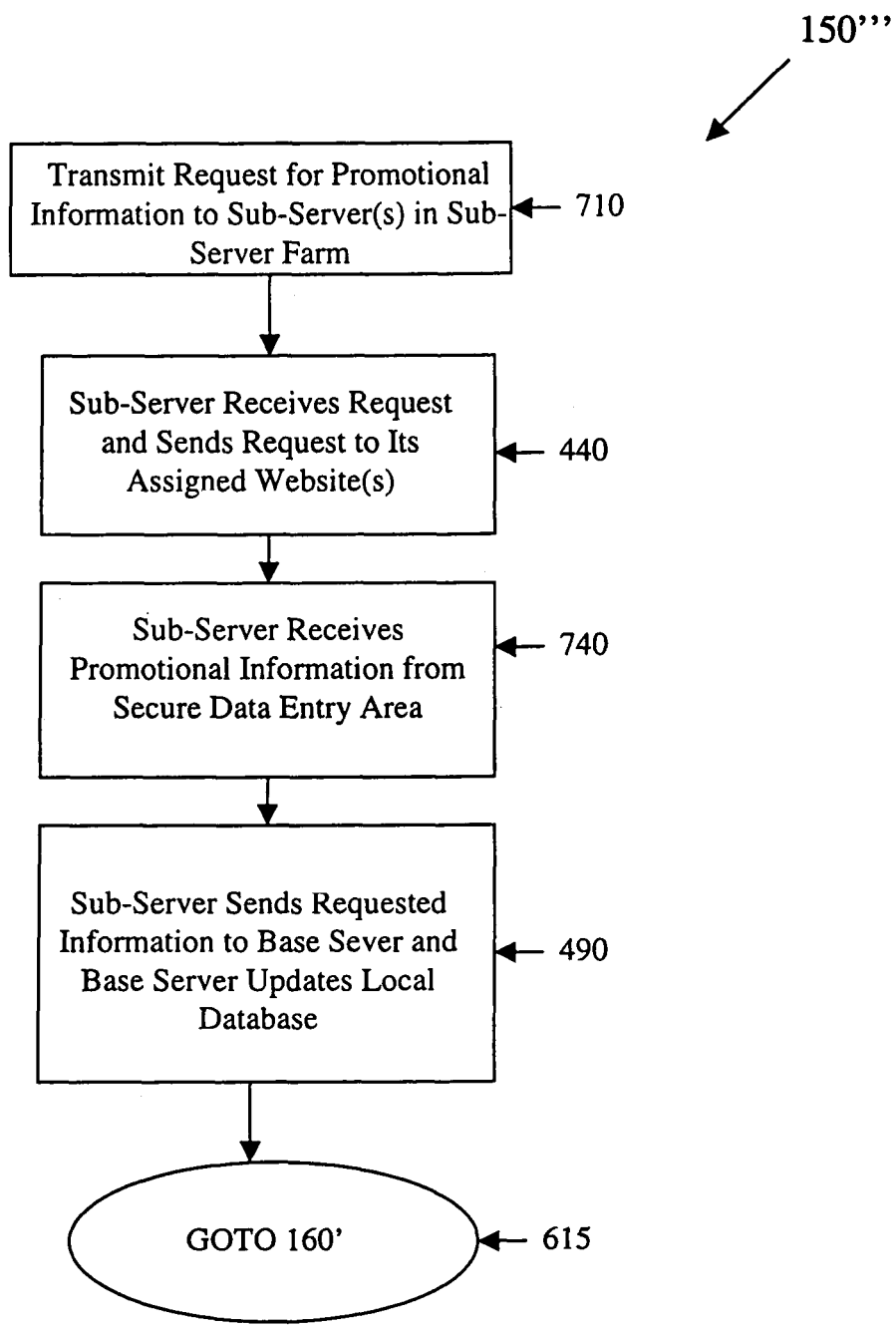
FIG. 16 is a flowchart describing an another alternative method for searching e-commerce websites for promotional information over the Internet.

Information input method 150''', as seen in FIG. 16, is a modified version of information sharing method 150". Information input method 150''' includes many of the steps from information sharing method 150" but also includes the additional step of receiving promotional information from the secure data entry area 740, as opposed to receiving the promotional information through the dynamic data link 730. Furthermore, there is also no need to wait for the secure data entry area to open. (see step 720 in FIG. 15). E-commerce website operators can enter data into the secure data entry area at will. The information is retrieved 740 by the sub-server(s) 79 whenever a user requests promotional information using the shopping news/promotional information request button 1012 (FIG. 3). Finally, the information retrieved using information input method 150''' can be displayed to the user using modified display method 160' as described above.

G. Item Identification Verification and Correction

There are times that searching for item information on various e-commerce websites is difficult because of the unique numbering systems these e-commerce websites have implemented. By breaking with industry standardized numbering schemes, these e-commerce websites have, in effect, become nearly impossible to search for item information. Usually, this is not intentionally done, for instance, to prevent intelligent agents such as sub-servers 79 from visiting the e-commerce websites. Rather its typically an embrace of either a proprietary identification scheme that the e-commerce website has inherited from leasing a third-party legacy database or a compromise between fitting a new data model into an old, concrete data framework (for example, fitting in 12 digit UPC numbers into the data scheme for 10 digit ISBN numbers).

However, in order to work effectively, interactive shopping system 30 relies on specific and verifiable numbering schemes that are related to an item's title and/or description. Giving a user prices on an item that might exist in different incarnations on different e-commerce websites is useless. For example, *The Sirens of Titan* exists in hardback, paperback, quality paperback, large print, and as a book on cassette. Searching merely for the prices of the title, *The Sirens of Titan* will return a conglomeration of prices for each of these formats. This is contrary to the overall philosophy behind interactive shopping system 30, which is to offer information that users can easily understand and about which they can quickly make judgments.

Figure 17:
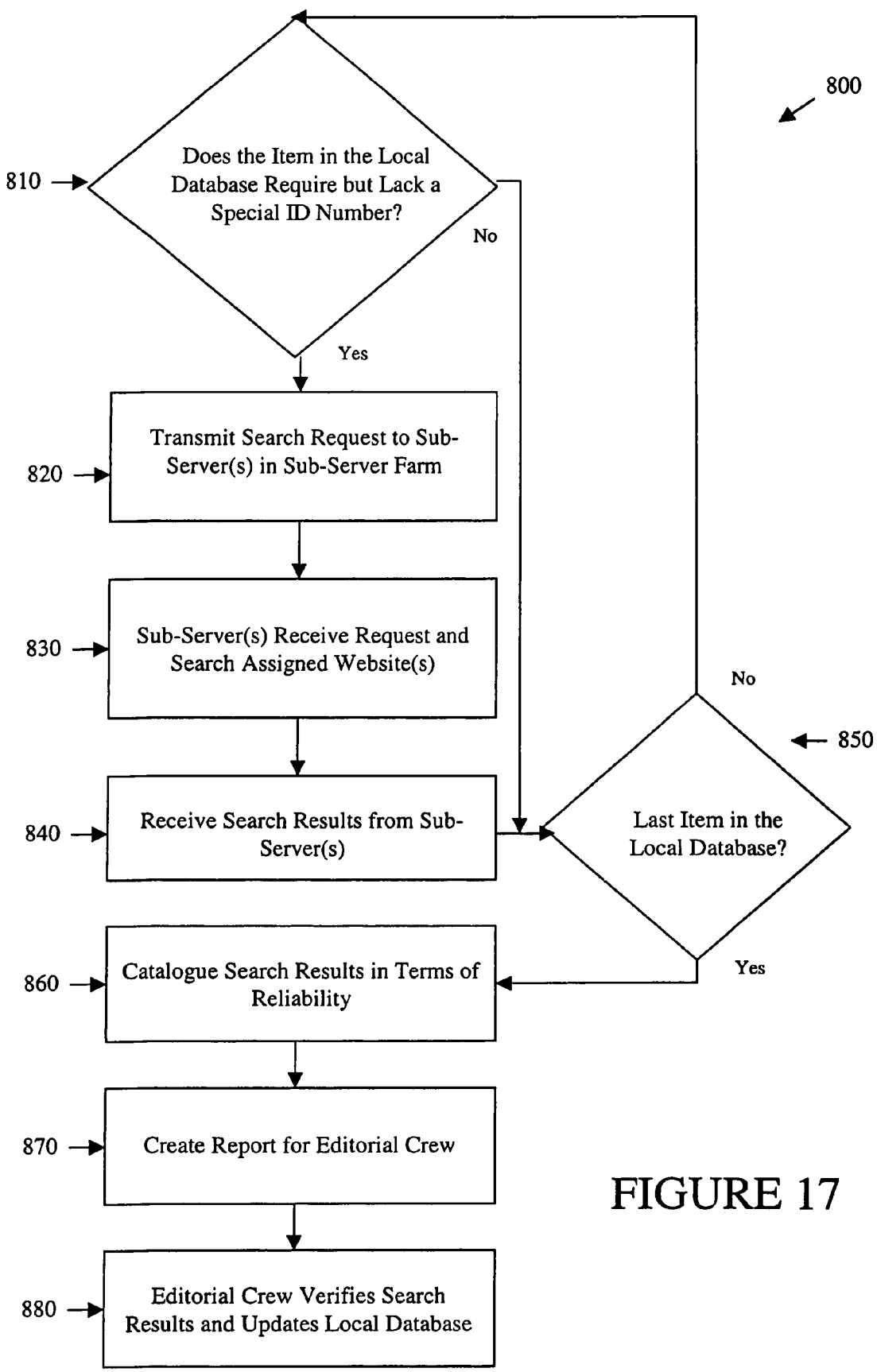
FIG. 17 is a flowchart describing a method for verifying and correcting item information in a local database.

In order to prevent this type of problem, correct item identification information must be maintained in the local database 74. FIG. 17 shows a flowchart for a method for verifying and correcting item information in the local database 74, generally indicated by the reference numeral 800. Correction method 800 preferably includes: determining whether an item in the local database 74 requires but lacks a unique identification number 810; if such an item exists in the local database 74, transmitting a search request to the sub-server farm 78 (step 820); the sub-server farm 78 receiving the search request and searching the assigned e-commerce website(s) for the requested information 830; receiving the search results from the sub-server farm 78 (step 840); determining whether the last item in the local database 74 has been checked for correct identification information 850; cataloguing the search results in terms of reliability 860; creating a report for an editorial crew 870; and the editorial crew verifying the search results and updating the local database 74 with the correct item identification information.

The base server 76 continually queries 810 the local database 74, asking whether there are any items in the local database 74, that require but lack special or unique identification numbers that are generated by specific e-commerce websites 59. For example, a CD of Christmas carols has a known UPC of 333333333333. That data is enough for the sub-server farm 78 to comparison shop most music e-commerce websites on the Internet. However, two e-commerce websites are exceptional in that items sold on the e-commerce websites are required to have unique ID numbers.

If there are no items listed in the local database 74 that require generation of specific numbers, the base server 76 notes that the checked item(s) has a complete descriptive identification number data set. If, however, the local database 74 reports that any items are missing a specific identification number, the base server 76 transmits 820 a request to the sub-server farm 78 to search all the assigned e-commerce websites 59 for the missing identification information.

The sub-server(s) 79 receive 830 the search request and search the assigned e-commerce website(s) 59 based on the descriptive information relating to the item, i.e., the title, author, artist, creator, manufacturer, or other descriptive criteria. In our previous example of the Christmas CD, the sub-server(s) 79 use the CD title, the artist or artists, soloists, date of production and performance, image, description, and any other important information to search the assigned e-commerce website(s) 59. If the assigned e-commerce website 59 being searched has a more robust search engine, the sub-server(s) 79 can take advantage of the search engine to help narrow the search. Of course, the entire reason that the interactive shopping system 30 does not use descriptive information to gather price data is because this method is fraught with delays and misinterpretation. To overcome these limitations, the correction method 800 relies heavily on reporting the search findings to an editorial crew.

Once the base server 76 receives the search results from the sub-server farm 78, and the base server determines 850 that the last item in the local database has been checked, the base server catalogues 860 the search results in terms of the reliability of the search results and creates 870 a nightly report for the editorial crew. The base server's 76 reliability index takes the form of recommendations to the editorial crew. Using the previous example of the Christmas CD, the sub-server farm 78 searches 830 the two specific e-commerce websites for further information on the Christmas CD. The sub-server(s) 79 search first by title and then (of if allowed simultaneously) by artist. If the search results come back with one specific item "hit" or resolution to the query, the odds of a successful match are extremely high. The sub-server(s) 79 pull up the specific item detail page and match description to description, track list to track list, annotation to annotation, and format to format to verify that this item matches the item in the local database 74. If there is no question that both items are exact matches, the sub-server(s) extract 840 that item's unique ID number from the assigned e-commerce website 59, the base server 76 receives 840 the information, and updates 880 the local database 74 with the item identification information.

If, however, there is a question about the particular item, for example, not all of the tracks on the Christmas CD listed in the local database 74 match up with the tracks of the Christmas CD sold by the e-commerce website, the sub-server(s) 79 compare as much information as possible during the search 830 and, using an intelligent parsing algorithm determines the percentage chance that the two items are similar. The intelligent parsing algorithm first attempts to match UPC, ISBN, or some other standard number code between the item listed in the local database 74 and the item on the e-commerce website. If there is no match, the algorithm tries next to match for example, title and author, or any other descriptive information (e.g., product name and description, manufacturer, etc.). The base server 76 then receives 840 this percentage from the sub-server farm 78 and creates 870 a report including the reliability information for retrieval by the editorial crew. The report may be in the form of a secure webpage (not shown).

When the editorial crew, which may be a human crew or some intelligent algorithm, begins verification analysis 880 of the report, it sees a list of successful and possible matches. Each item that the sub-server farm 78 searched for is categorized from 100% Match to No Match Found. Each match, possible match, or non-match has the title information, standard industry identification number, and the probable link to the e-commerce websites 59 that sell the disputed item. The editorial crew then checks the low reliability links and determines whether these low reliability e-commerce websites are or are not associated with the correct item. If the e-commerce websites do sell the same item that is stored in the local database 74, the editorial crew updates 880 the local database 74 with the appropriate unique number, which the sub-server(s) 79 can use later when searching for item information.

Having described preferred embodiments of a novel system and method for efficiently searching electronic commerce websites over the Internet (which are intended to be illustrative and not limiting), note that modifications and variations can be made by persons skilled in the art in light of the above teachings. Therefore, understand that changes may be made in the particular embodiments disclosed which are within the scope and spirit of what is described as defined by the appended claims.

Having thus described a novel system and method for efficiently searching electronic commerce websites over the Internet with the details and particularity required by the patent laws, what is claimed and desired protected by Letters Patent is set forth in the appended claims.

What is claimed is:

1. An apparatus comprising:
    a server configured to search electronic commerce websites on a network for information regarding a product prior to receiving a query regarding the product;
    a database operatively coupled to the server and configured to store the information regarding the product;
    an interface associated with the server and configured to receive the query regarding the product; and
    a processor operatively coupled to the server, the database, and the interface, wherein the processor is configured to:
        determine that the information regarding the product has been cached in the database within a time limit, wherein the time limit is a variable that is set dynamically based at least in part on network congestion; and
        provide, responsive to the determination that the information regarding the product has been cached within the time limit, the information regarding the product directly from the database in response to the query.

2. The apparatus of claim 1, wherein the interface is further configured to receive a live shopping request for the product.

3. The apparatus of claim 2, wherein the server, in response to the live shopping request, is configured to provide the query to a sub-server with instructions to perform an updated search of the electronic commerce websites, and wherein the interface is configured to return updated information regarding the product from the updated search in response to the live shopping request.

4. The apparatus of claim 1, wherein the information stored in the database comprises cached information, and wherein the server is configured to periodically update the cached information stored in the server.

5. The apparatus of claim 1, wherein the server is configured to identify matches to the query, and wherein the interface is configured to display the matches in response to the query.

6. The apparatus of claim 5, wherein the interface is configured to receive a selection of at least one of the matches to the query.

7. The apparatus of claim 1, wherein the interface is configured to display a list of popular items.

8. A method comprising:
    searching, with a server device, electronic commerce websites on a network for information regarding a product prior to receiving a query regarding the product;
    storing, in a database operatively coupled to the server, the information regarding the product;
    receiving the query regarding the product;
    determining, by a processor, that the information regarding the product has been cached in the database within a time limit, wherein the time limit is a variable that is set dynamically based at least in part on network congestion; and
    returning, responsive to determining that the product has been cached within the time limit, the information regarding the product directly from the database in response to the query.

9. The method according to claim 8, further comprising:
    identifying one or more matches to the query; and
    receiving a selection of at least one match of the one or more matches, wherein the selection specifically identifies the product.

10. A system comprising:
    means for receiving a query, wherein the query includes a request to find product information for a product from a website;
    means for searching a local database for cached product information relating to the product, wherein the cached product information is obtained and stored in the local database prior to receiving the query;
    means for determining that the cached product information has been updated within a time limit;
    means for-setting the time limit dynamically based at least in part on network congestion; and
    means for providing, responsive to determining that the cached product information has been updated within the time limit, the cached product information directly from the local database in response to the query.

11. The system of claim 10, further comprising:
    means for identifying a match to the query; and
    means for receiving a selection of the match, wherein the match specifically identifies the product.

12. The system of claim 10, further comprising:
    means for displaying an elapsed time since the cached product information was cached in the local database.

13. The system of claim 10, further comprising:
    means for accepting an override input; and
    means for initiating polling of the website for the product information in response to the override input regardless of whether the local database has the cached product information.

14. The system of claim 10, further comprising:
    means for determining a location of the product information within the website;
    means for extracting the product information from the location; and
    means for caching the extracted product information in the local database.

15. The system of claim 10, wherein the means for providing the cached product information comprises:
    means for arranging the cached product information; and
    means for displaying the arranged cached product information by way of a hypertext markup language (HTML) page.

16. The system of claim 10, further comprising means for retrieving the product information from the website.

17. The system of claim 16, further comprising:
   means for storing the retrieved product information in the local database.

18. The system of claim 17, wherein the query comprises an identification of the website, and further comprising:
   means for identifying a specified number of product information results from the website, wherein the specified number of product information results is determined based on at least one of a time when the product information results were retrieved and an order of importance of the product information results as determined by the website; and
   means for generating a display of the specified number of product information results from the website, wherein the display includes a link to the website and a time and date stamp indicating when the product information results were last retrieved.

19. A non-transitory computer-readable medium having instructions stored thereon, the instructions comprising:
   instructions to search electronic commerce websites on a network for information regarding a product prior to receiving a query regarding the product;
   instructions to store the information regarding the product in a database;
   instructions to receive the query regarding the product;
   instructions to determine that the information regarding the product has been updated within a time limit;
   instructions to dynamically set the time limit as a variable based at least in part on network congestion; and
   instructions to return, responsive to the determination that the information regarding the product has been updated within the time limit, the information regarding the product directly from the database in response to the query.

* * * * *

UNITED STATES PATENT AND TRADEMARK OFFICE
CERTIFICATE OF CORRECTION

PATENT NO. : 9,037,504 B2  
APPLICATION NO. : 11/705003  
DATED : May 19, 2015  
INVENTOR(S) : Mark Nair Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this
Fifteenth Day of March, 2016

Michelle K. Lee
*Director of the United States Patent and Trademark Office*